United States Patent
Hartmann et al.

(10) Patent No.: US 9,092,737 B2
(45) Date of Patent: Jul. 28, 2015

(54) SYSTEMS, METHODS, AND APPARATUS FOR 3-D SURFACE MAPPING, COMPLIANCE MAPPING, AND SPATIAL REGISTRATION WITH AN ARRAY OF CANTILEVERED TACTILE HAIR OR WHISKER SENSORS

(71) Applicants: Mitra J. Hartmann, Evanston, IL (US); Joseph H. Solomon, Park Ridge, IL (US)

(72) Inventors: Mitra J. Hartmann, Evanston, IL (US); Joseph H. Solomon, Park Ridge, IL (US)

(73) Assignee: NORTHWESTERN UNIVERSITY, Evanston, IL (US)

( * ) Notice: Subject to any disclaimer, the term of this patent is extended or adjusted under 35 U.S.C. 154(b) by 210 days.

(21) Appl. No.: 13/663,196

(22) Filed: Oct. 29, 2012

(65) Prior Publication Data
US 2013/0166484 A1  Jun. 27, 2013

Related U.S. Application Data

(63) Continuation-in-part of application No. 12/847,822, filed on Jul. 30, 2010, now Pat. No. 8,504,500.

(60) Provisional application No. 61/229,991, filed on Jul. 30, 2009.

(51) Int. Cl.
G06N 3/08     (2006.01)
G01B 5/28     (2006.01)

(52) U.S. Cl.
CPC ... *G06N 3/08* (2013.01); *G01B 5/28* (2013.01)

(58) Field of Classification Search
CPC ........... G06N 3/08; G06N 3/02; G06N 3/063; G06N 3/04; G06N 3/10; G06N 3/0454; G06N 3/0427; G06N 99/005; G01B 5/20; G01B 5/28
USPC ................................................ 706/15, 16, 42
See application file for complete search history.

(56) References Cited

U.S. PATENT DOCUMENTS 6,014,652 A     1/2000  Hill et al.
2005/0246297 A1*  11/2005  Chen et al. ...................... 706/15

(Continued)

OTHER PUBLICATIONS

Schultz A. et al. "Multifunctional Whisker Arrays for Distance Detection, Terrain Mapping, and Object Feature Extraction", Proceedings of the 2005 IEEE International Conference on Robotics and Automation, Barcelona, Spain, pp. 2588-2593, Apr. 2005 (Previously supplied in the parent application).*

(Continued)

*Primary Examiner* — Jeffrey A Gaffin
*Assistant Examiner* — Dave Misir
(74) *Attorney, Agent, or Firm* — Hanley, Flight and Zimmerman, LLC

(57) ABSTRACT

Systems, methods, and apparatus are provided using signals from a set of tactile sensors mounted on a surface to determine a surface topography. An example method includes receiving a set of moment and force input data from one or more identified topographies. The example method includes using a neural network to receive input from a training data set based on the first set of moment and force input data from the one or more identified topographies. Network weights to be used by the neural network to produce the training data set are modified via an evolutionary algorithm that tests vectors of candidate network weights. The example method includes receiving a moment and force input from a test object surface and reconstructing the surface topology based on the neural network outputs.

19 Claims, 16 Drawing Sheets

(56) References Cited

U.S. PATENT DOCUMENTS

| | | | |
|---|---|---|---|
| 2008/0235972 | A1 | 10/2008 | Hartmann et al. |
| 2009/0133508 | A1 | 5/2009 | Johansson et al. |
| 2009/0315989 | A1* | 12/2009 | Adelson .................. 348/135 |
| 2010/0071222 | A1* | 3/2010 | Solomon et al. .............. 33/556 |
| 2011/0029470 | A1 | 2/2011 | Hartmann et al. |

OTHER PUBLICATIONS

Russell R. et al. "Object Location and Recognition using Whisker Sensors", Australasian Conference on Robotics and Automation, pp. 1-9, 2003 (Previously supplied in the parent application).*

Fend M. "Whisker-Based Texture Discrimination on a Mobile Robot", ECAL 2005, pp. 302-311 (Previously supplied in the parent application).*

Yokoi H., "Artificial Whiskers: Structural Characterization and Implications for Adaptive Robots", Journal of Robotics and Mechatronics, vol. 17, No. 5, pp. 584-595, 2005 (Previously supplied in the parent application).*

Fend M. et al.,"An Active Artificial Whisker Array for Texture Discrimination", Proceedings of the 2003 IEEE/RSJ Intl. Conference on Intelligent Robots and Systems, Las Vegas, Nevada, Oct. 2003, pp. 1044-1049 (Previously supplied in the parent application).*

Kim D. et al., "Biomimetic Whisker Experiments for Tactile Perception", Proceedings of the International Symposium on Adaptive Motion in Animals and Machines, pp. 1-7, 2005 (Previously supplied in the parent application).*

Kim D. et al., "Biomimetic whiskers for shape recognition", Robotics and Autonomous Systems, vol. 55, pp. 229-243, 2007 (Previously supplied in the parent application).*

Bebek O. et al., "Whisker Sensor Design for Three Dimensional Position Measurement in Robotic Assisted Beating Heart Surgery", IEEE International Conference on Robotics and Automation, Roma, Italy, Apr. 2007, pp. 225-231 (Previously supplied in the parent application).*

Kaneko M. et al., "3-D Active Antenna for Contact Sensing", IEEE International Conference on Robotics and Automation, pp. 113-119, 1995 (Previously supplied in the parent application).*

Solomon J. et al., "Robotic whiskers used to sense features", Nature, vol. 443, Oct. 5, 2006, p. 525 and supplementary information pp. 1-12 (Previously supplied in the parent application).*

Scholz G. et al., "Profile Sensing With an Actuated Whisker", IEEE Transactions on Robotics and Automation, vol. 20, No. 1, Feb. 2004, pp. 124-127 (Previously supplied in the parent application).*

Lee M. et al., "Tactile sensing for mechatronics—a state of the art survey", Mechatronics, vol. 9, pp. 1-31, 1999 (Previously supplied in the parent application).*

Kaneko M. et al., "Active Antenna for Contact Sensing", IEEE Transactions on Robotics and Automation, Vol. 14, No. 2, Apr. 1998, pp. 278-291.*

Russell R. et al., "Multi-Sensory Synergies in Humanoid Robotics", International Journal of Humanoid Robotics, 2004.*

International Bureau "International Preliminary Report on Patentability," issued in connection with International Application Serial No. PCT/US2010/043980, mailed on Jan. 31, 2012, 7 pages.

* cited by examiner

_US 9,092,737 B2_

SYSTEMS, METHODS, AND APPARATUS FOR 3-D SURFACE MAPPING, COMPLIANCE MAPPING, AND SPATIAL REGISTRATION WITH AN ARRAY OF CANTILEVERED TACTILE HAIR OR WHISKER SENSORS

CROSS-REFERENCE TO RELATED APPLICATIONS

The present application claims priority as a continuation-in-part to U.S. patent application Ser. No. 12/847,822, filed on Jul. 30, 2010, which claims priority to U.S. Provisional Application No. 61/229,991, filed on Jul. 30, 2009, each of which is herein incorporated by reference in its entirety.

STATEMENT REGARDING FEDERALLY SPONSORED RESEARCH OR DEVELOPMENT

This invention was made with government support under IIS-0613568 and IOS-0818414 awarded by the National Science Foundation. The government has certain rights in the invention.

FIELD OF INVENTION

The presently described technology generally relates to tactile sensing. In particular, the presently described technology relates to systems, methods, and apparatus for three-dimensional reconstruction using an array of tactile sensors.

BACKGROUND

Whiskers have attracted increasing interest from engineers seeking to imitate their numerous desirable sensing properties. Whiskers are physically robust, mechanically simple, and yet can precisely extract object shape, texture and the velocity of fluid flow. The diverse capabilities of whiskers are amply demonstrated by the animals that use them to perform difficult behavioral tasks. Robotic whiskers have been used for various types of sensing tasks, and several recent studies have specifically addressed the issue of three-dimensional (3-D) feature extraction, wherein the goal is to infer the shape of an object by repeated contact with one or more whiskers. These studies have generally taken one of two approaches: whisker "tapping" or whisker "sweeping."

Whisker tapping involves rotating or translating the whisker(s) against an object by a small angle and inferring where along the length of the whisker initial contact occurred (i.e., radial distance extraction). Using this information, along with information about the angle of initial contact and location of the whisker base, allows estimation of the contact point location in 3-D space for each whisker.

Whisker sweeping involves moving the whisker along or against the object far past the location of initial contact in order to estimate a collection of contact point locations as the whisker slips along the surface.

BRIEF SUMMARY

Certain examples provide a method of determining two and/or three dimensional surface topography of an object. The example method includes receiving a first set of moment and force training data from one or more identified topographies. The example method includes using a neural network to receive input from a training data set based on the set of moment and force input data from the one or more identified topographies. Network weights to be used by the neural network based on the training data set are modified via an evolutionary algorithm that tests vectors of candidate network weights. The example method includes receiving a second set of moment and force input from an object surface and using the second set of data to provide a surface mapping of the object.

Certain examples provide a method of determining material compliance of an object. The example method includes receiving a first set of moment and force input data from identified topographies and compliances. The example method includes using a neural network to receive input from a training data set based on the identified topography and compliances, wherein compliance is defined as the change in compression per change in contact force. The example method includes receiving a second set of moment and force input data from a training data set to form a local topographic and compliance mapping of the object.

Certain examples provide a tangible computer readable storage medium comprising computer program code which, when executed by a processor, implements a method of determining surface topography of an object. The example method includes receiving a first set of moment and force input data from one or more identified topographies. The example method includes using a neural network to receive input from a training data set based on the first set of moment and force input data from the one or more identified topographies. Network weights to be used by the neural network are modified via an evolutionary algorithm that tests vectors of candidate network weights. The example method includes receiving a second set of moment and force input data from an object surface and using the second set of data to provide a surface mapping of the object.

Figure 1:
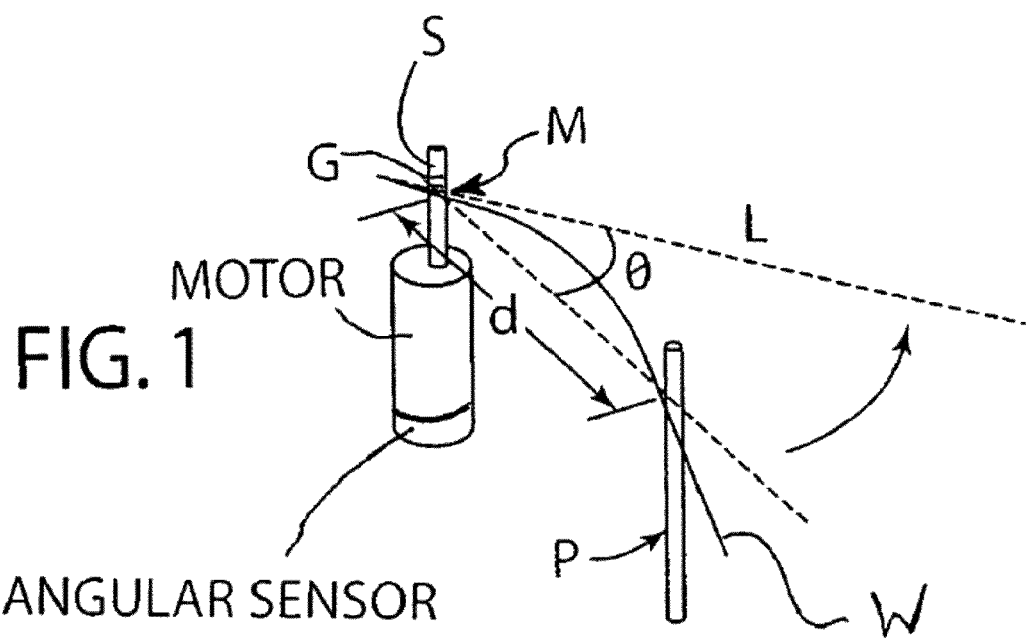
FIG. 1 is a schematic view of sensing device having a whisker element rotated by motor against an object.

The following detailed description of certain embodiments will be better understood when read in conjunction with the appended drawings. For the purpose of illustrating the invention, certain embodiments are shown in the drawings. It should be understood, however, that the present invention is not limited to the arrangements and instrumentality shown in the attached drawings, nor is it limited to particular whisker and/or other sensor geometries (e.g., length, taper, or intrinsic curvature), configurations, etc.

DETAILED DESCRIPTION OF CERTAIN EMBODIMENTS

Although the following discloses example methods, systems, articles of manufacture, and apparatus including, among other components, software executed on hardware, it should be noted that such methods and apparatus are merely illustrative and should not be considered as limiting. For example, it is contemplated that any or all of these hardware and software components can be embodied exclusively in hardware, exclusively in software, exclusively in firmware, or in any combination of hardware, software, and/or firmware. Accordingly, while the following describes example methods, systems, articles of manufacture, and apparatus, the examples provided are not the only way to implement such methods, systems, articles of manufacture, and apparatus.

When any resulting claims are read to cover a purely software and/or firmware implementation, in at least one example, at least one of the elements is hereby expressly defined to include a tangible medium such as a memory, DVD, Blu-ray, CD, etc. storing the software and/or firmware.

Certain examples provide reconstruction of three-dimensional (3-D) object morphology, position, orientation and compliance using an array of tactile sensors.

In certain examples, signals that come from a set of tactile sensors mounted on a surface are used to determine the 3-D morphology (including size, shape, orientation, position) and compliance of objects of arbitrary shape. The algorithm used to interpret the sensory data may include analytical, mechanical, numerical, and/or neural network approaches.

The tactile sensors may be flexible and resemble hair, whiskers, and/or antenna. Sensors may be embedded in the surface to form a more skin-like structure, or they may be a combination of any of these implementations, for example. In the case that the tactile sensors are hair-like, whisker-like or antenna-like, they may have sensors all along their length and/or they may have sensors at their base. The sensors may be of different or similar geometries, including features such as taper, taper ratio, intrinsic curvature, and length.

The surface on which the tactile sensors are mounted may be rigid, or it may be flexible and/or deformable. The sensors themselves may be flexible and/or deformable. The internal distribution of stresses and strains within the surface may also be measurable. The surface (and attached sensors) may be moved with any numbers of degrees of freedom against an object, and/or an object may be moved against the surface (and attached sensors) with any numbers of degrees of freedom. The sensors themselves may be actuated or static with respect to the surface which may or may not itself move. The described technologies can accommodate for movement of the array with respect to the object, the object respect to the whisker, and both simultaneously.

The sensors themselves may be actuated or static with respect to the surface. The signals coming from the sensors may be sensed by technologies that include but are not limited to the following: vision-based, photo-interrupter, photoelastic, magneto-sensing, strain gage, capacitive, binary, force/torque load cell, piezoelectric, and Hall effect.

There is no restriction on the type of algorithm used to interpret the sensory data, which may include analytical, numerical, and/or neural network approaches. Within the neural network approach, a variety of network topologies, neuron models, and training algorithms may be used. Some specific examples include: Multilayer perception, with or without feedback; Radial basis function (RBF) network; Hopfield network; Elman network; Stochastic neural network; Continuous time recurrent neural network; Topology and Weight Evolving Artificial Neural Network (TWEANN); Compositional Pattern Producing Network (CPPN), etc. Analytic and/or numerical approaches may also be "hybridized" into a neural network framework, by using their outputs as network inputs (e.g., "features").

The scale and shape of the sensors, including total arc length, diameter profile (e.g., as a function of arc length), and curvature profile are not constrained. The scale, shape, and configuration of the sensing array are not limited. The technology can work over any spatial scale. The number of sensors is not limited.

If a system has the capacity to measure full 3-D force and moment at the base of a whisker and a single point contact is assumed, then the Euler-Bernoulli equation can be integrated (e.g., starting from the base) to compute the full shape of the whisker and the location of the contact point. In certain examples, explicit integration may not be performed. Instead, integration can be performed implicitly (e.g., via a neural net) or partially, for example.

The same algorithmic and neural network techniques can apply equally well to deformable membrane surfaces (e.g., skin). Such a membrane can be covered or embedded with sensors, and network(s) can learn to infer the surface shape from the sensor signals.

3-D surface representation is not limited to any particular mathematical framework. For example, representations can be applied to frameworks such as 3-D contact point collections, tri-meshes, geometrical primitives, radial basis function network, artificial neuronal place cell firing rates, etc.

Classical elasticity theory can be used to model a whisker element W as a cylindrical beam bending against a rigid, motionless object (shown in FIG. 1 as peg P) and to derive a monotonic relationship between radial contact distance d, a pushing angle $\theta$, and moment M (e.g., torque) at a whisker base (see FIG. 1). Through either rotation or translation (or a combination of these motions) of the whisker at or near the base region thereof (where the moment sensor resides) against an object, an initial point that the whisker touches along the object during the whisker's movement can be computed. The derivation can alternately be conducted in terms of force instead of moment, and/or translation instead of rotation. Although description in provided with respect to determining a change in moment at the base region of the whisker element as a result of bending, this is offered for purposes of illustration and not limitation. Other examples can be practiced by determining a change in curvature or other deflection of the whisker element at the base region (or other region). The whisker element, the object, or both can be moved to provide relative motion there between.

Each whisker rotates or translates about its base, where the bending moment and/or force are measured. It can be convenient, but it is not necessary, to allow all whiskers to rotate or translate in unison, thus allowing for a simple array design that requires only a single motor for actuation. A change in contact point location can be incrementally inferred through continuous measurement of torque (e.g., bending moment) at the whisker base. Each whisker rotates or translates about its base, where the bending moment is measured. It can be convenient, but it is not necessary, to allow all whiskers to rotate or translate in unison, thus allowing for a simple array design that requires only a single motor for actuation. Co-pending application Ser. No. 11/906,751 filed Oct. 3, 2007, discloses a method for performing initial contact point measurement under such conditions or constraints. Co-pending application Ser. No. 12/455,389 extends the method of co-pending application Ser. No. 11/906,751 and allows continued estimation of contact point beyond initial contact with an object using only measurement of moment (e.g., torque) to iteratively infer successive contact point locations, thus providing the maximum amount of available shape information per whisk.

There are two ways, for example, that a whisker can slip along an object. Lateral slip occurs when the object surface at the contact point is slanted relative to the plane of rotation and the angle of the friction cone is not large enough to prevent out-of-plane movement. Longitudinal slip occurs when the curvature of the object within the plane of rotation at the contact point is finite (e.g., not a point-object or an object's corner). Conveniently, longitudinal slip affords the opportunity to sense additional contact points as the whisker slips along the object periphery, providing further information about object shape over a single whisk.

The above definitions of lateral and longitudinal slip describe the movement of the contact point along the object in Euclidean space. The contact point can also move along the whisker, even in the absence of lateral and/or longitudinal slip. For example, if a whisker rotates in a plane against a point object, the location of contact on the whisker will change, but the location of object contact will remain constant. This type of contact-point movement on the whisker is termed axial slip.

In certain examples, consistently reliable object distance extraction in the presence of significant surface slopes includes a reasonable estimate of a friction coefficient between a whisker element and an object. There are three methods, for example, by which an estimate of friction can be obtained. First, if an orientation of the entire whisker array can be tilted along an x-axis of any particular whisker, whisks can be performed against the object at a variety of orientations, effectively adjusting the surface slope. A range of slopes is provided for which $\phi=0°$ would be equal to $2\alpha$ (the accuracy depending on how gradually the orientation was adjusted). This essentially amounts to an in-field test of the object to determine the friction coefficient, where a represents a friction cone angle. Second, an array can explore an object and repeat feature extraction to transform contact points into a 3-D object shape (e.g., splining) using a range of friction coefficients. The one that leads to the most consistent contact point positions and thus the smoothest surface is kept. Third, the array can whisk against the object at a variety of array orientations. All the contact points sampled are given a confidence measure related to $\phi$, such that points with large $\phi$ are ignored or have less influence on the feature extraction algorithm. Note that methods 1 and 2 assume the friction coefficient is consistent over the entire object, while method 3 does not.

In some examples, contact can occur at the whisker tip or end. Such cases may result in increased rotational compliance, causing an estimate of object distance, $d_x$, to be greater than the whisker length. A solution is to give $d_x$ a threshold equal to the whisker length. It is also worth noting that regions of an object that are concave with respect to the plane of whisker rotation can be sampled through tip contact with a straight whisker. Tip contact thus can be desirable for at least two reasons: it potentially helps provide a very precise measurement of contact distance (since the whisker length is fixed), and allows concave regions of an object to be sampled.

Figure 2:
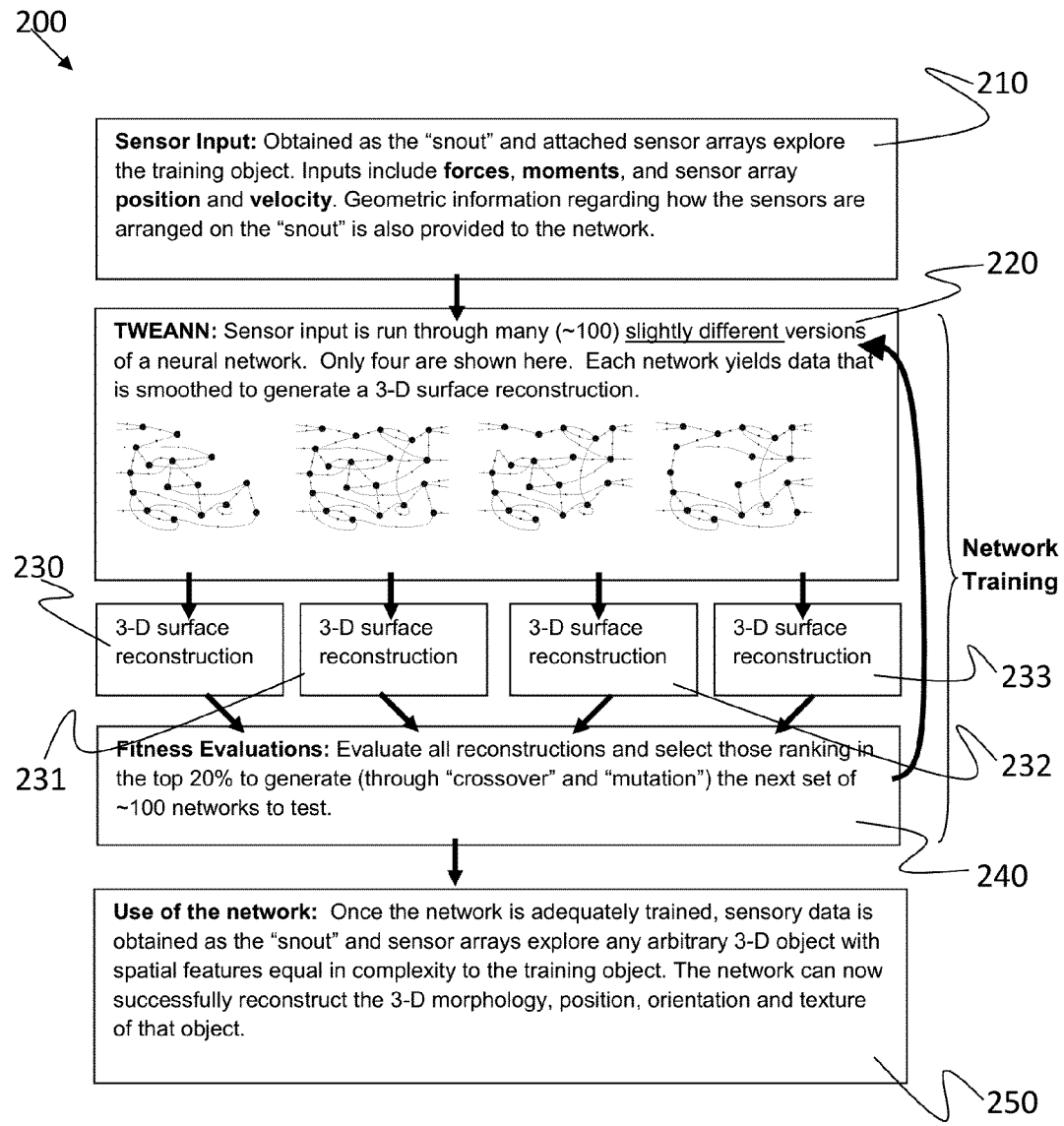
FIG. 2 illustrates an example flowchart of a method to train a network to perform 3-D reconstruction.

One particular non-limiting instantiation of example technology is depicted in the flowchart of FIG. 2. FIG. 2 illustrates a flow diagram for a method 200 for network training to reconstruct the 3-D morphology, position, orientation and texture of an object.

As illustrated in the example network training process 200, evolutionary learning occurs over several (e.g. 100) "generations" or iterations. For example, for each iteration or application of network weights, force and moment data can be provided to generate estimated spherical coordinates for one or more contact points. Cartesian coordinates (x, y, z) of each whisker in a sensor array can be determined based on the estimated spherical coordinates. A fitness function for each candidate neural network provides an estimate of how close each one of the contact points lies to the surface being measured. The example shown in FIG. 2 uses a TWEANN network, but other examples are not limited to a TWEANN network.

In the example of FIG. 2, an array of whisker-like sensors is arranged on a hemispherical surface (e.g., a "snout") whose tip (X, Y, Z) position and ($\Theta$, $\Phi$, $\Psi$) orientation is known at all times in laboratory or reference coordinates. The tip position and orientation can be determined absolutely, through a "dead-reckoning" approach, through incremental registration of extracted surface segments, or through any combination thereof, in which incremental movements are added to the original position and orientation. As used herein, "snout" refers to a general surface on which the whiskers and/or other sensors are mounted. While the example of FIG. 2 provides a hemispherical surface for purposes of illustration only, the snout may or may not be a hemisphere or other shape suitable for mounting or otherwise positioning the whisker sensors.

At 210, sensor input is obtained as the "snout" and attached sensor arrays explore the training object. Inputs include forces, moments, position (e.g., sensor array position), and velocity.

At 220, sensor input is run through many (e.g., approximately 100) slightly different versions of a neural network (e.g., a TWEANN network). Only four are shown here for purposes of illustration. For example, for each iteration or application of network weights, force and moment data can be provided to generate estimated spherical coordinates for one or more contact points. Cartesian coordinates of each sensor in a sensor array can be determined based on the estimated spherical coordinates. A fitness function for each candidate neural network provides an estimate of how close each one of the contact points lies to the surface being measured. Each neural network version yields data that is smoothed, for example, to generate a 3-D surface reconstruction.

At 230-233, 3-D surface reconstruction is performed for each neural network sensor input. At 240, fitness evaluations are conducted for all reconstructions to select the reconstruction(s) ranking in the top 20% to generate (e.g., through "crossover" and "mutation") the next set of approximately 100 networks to test.

At 250, once a network is adequately trained, sensory data is obtained as the "snout" and sensor arrays explore an arbitrary 3-D object with spatial features equal in complexity to the training object. The network can successfully reconstruct the 3-D morphology, position, orientation and texture of that object.

Figure 3:
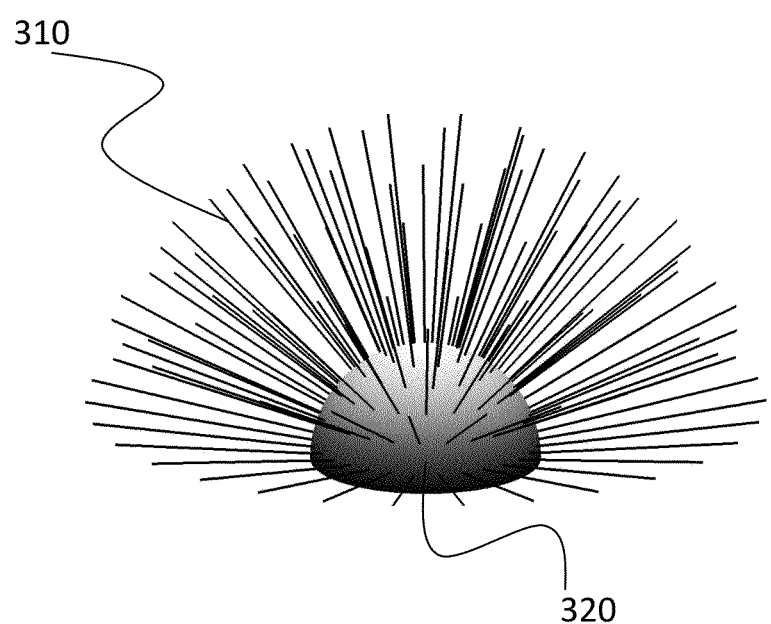
FIG. 3 illustrates an example whisker sensor array.

In this example, a total of 100 straight, tapered flexible whiskers emerge from the snout in a regular, grid-like fashion, as shown in FIG. 3. The number of whiskers could be as few as 1 or as many as desired. Each whisker is equipped with a two-axis torque sensor, enabling it to sense moments at the base ($M_y$, $M_z$) caused by deflections in the two directions orthogonal to the whisker's longitudinal axis, and a one-dimensional (1-D) force sensor, enabling it to sense axial forces. As shown in FIG. 3, a whisker (sensor) array 310 is mounted on the "snout" 320. In this example, there are five rows of whiskers, and the whiskers are distributed in equal increments within each row.

Figure 4:
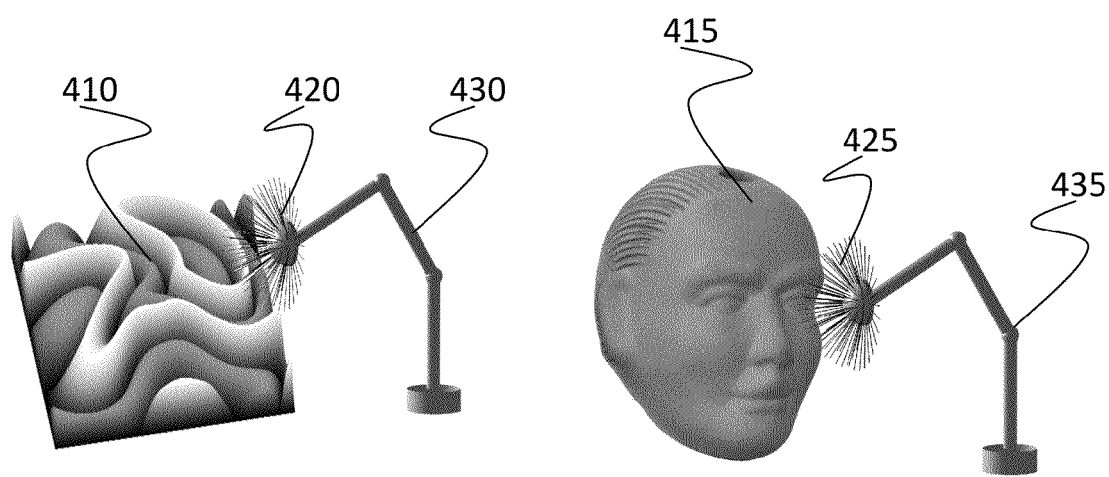
FIG. 4 illustrates example 3-D object sensing and morphology.

In an example application, a goal is to extract the 3-D surface morphology (e.g., shape contours) of an arbitrary object 410, 415. A snout 420, 425 can be attached to a support 430, 435, such as a PUMA 560 style robot arm, as shown in FIG. 4, allowing the array 420, 425 to be moved to an arbitrary position and orientation within a given workspace. The feature extraction process is divided into a series of "bouts." Between bouts, the array 420, 425 is moved to some desired position/orientation by the robot arm 430, 435. During bouts, the arm 430, 435 uses a single degree of freedom at the wrist to rotate the array 420, 425 back and forth against the object surface 410, 415.

For each whisker, a role of the neural network is to estimate the location of the contact point with respect to its base in spherical coordinates. Hence, on each time step t, each whisker w has three outputs which represent the position of the contact point in local spherical coordinates: ($r_{w,t}$, $\theta_{w,t}$, $\phi_{w,t}$). These local spherical coordinates are converted to the laboratory/reference frame, and smoothly interpolated using a smoothing spline to reconstruct the surface morphology.

A neural network is provided to output the local contact point locations, such that they closely overlie the actual surface being sensed. In this example, a Topology and Weight Evolving Artificial Neural Network (TWEANN) is used, which is a class of neural network that learns both the network topology and weights for a given task using an evolutionary learning framework. Because networks within a given row are symmetrically arranged on the snout, only a single network needs to be evolved for each row, for a total of five networks. Inputs to each network include the following: $M_y$, $M_z$; $M_y$-dot and $M_z$-dot, time derivatives of $M_y$ and $M_z$; a, a change in rotation angle since previous contact (e.g., obtained directly from movement of the snout); a-dot, an angular speed of rotation; A an angle of the whisker base's longitudinal axis with respect to the plane of rotation (fixed during a given rotation); and a bias term (e.g., 1.0).) β is obtained directly from the geometry of the mounting of the sensors on the snout, for example.

For other networks and whisker/antenna instantiations, inputs can also include any of the following variables: higher temporal derivatives of any of the variables listed above; $M_x$ and all of its temporal derivatives; all components of force at the whisker base ($F_x$, $F_y$, $F_z$) and their temporal derivatives; if the whisker/antenna/haircell has sensors along its length, then all forces and moments along its length; and any sensor reading whose units are not directly convertible to force or torque, e.g. several of the sensor technologies mentioned above.

In addition, each network is allowed to evolve connections from nodes of neighboring whiskers' networks. The neighboring whiskers may be from within the row or from either neighboring row, for example.

Training of the networks involves the use of a "training object" that possesses a variety of intricate features of varying spatial frequency and curvature. An example of a training object 410 is shown on the left side of FIG. 4.

In the example of FIG. 4, the "snout" 420 with attached sensors is mounted on a robot arm 430 or other support and explores the training object 410. Once the network is adequately trained, the snout and sensor array can explore any object sufficiently similar to the training object (e.g., the "test" object 415) and the 3-D morphology as well as position, orientation, and compliance can be reconstructed.

Training of the neural network involves the use of one or more "training objects" 410 that possess a variety of intricate features of varying spatial frequency, and for which a geometric description is precisely known, e.g. as a wire-frame model. Such training objects 410 can include various complex real-world objects whose assortment of features are empirically found to encompass those that are expected to be encountered in practice, and/or custom-engineered objects that are designed to cover some given range of spatial frequencies. For example, if it is known that the whisker array will be used to sense the external morphology of a human heart, then a model of the human heart could be used. Alternatively, if the types of object to be encountered are less well-defined, then training over custom-engineered test objects is an option.

There may be some trade-off between the degree of mathematical rigor employed to ensure that the test objects cover all spatial frequencies within some range, and the pragmatic benefit of constructing test objects that cover a more limited frequency range, but possess a spatial structure that more closely reflect the natural statistics of real-world objects. The former case can involve using a random number generator to create band-limited white noise, and transferring that signal into a two-dimensional (2-D) height-map, for example. The latter case can involve using a Compositional Pattern Producing Network (CPPN) to create height-map patterns that involve repetition, symmetry, and curved ridges, for example. An example of the CPPN case is shown in the left side of FIG. 4.

During the network training, the robot arm 430 positions the sensor array 420 at a variety of positions/orientations in front of the training object 410, and brush the whiskers against it 410 a number of times (e.g., five). The data gathered will then be used to train the TWEANN with the goal of having the extracted contact points match up as closely as possible with the surface of the training object 410.

To train the TWEANN involves a series of fitness evaluations. Each fitness evaluation involves running the training data through the TWEANN network, and computing the sequence of 3-D contact points in the laboratory coordinate system. The fitness function includes a positive constant value (e.g. whisker length) minus an average Cartesian distance between each extracted contact point and a closest point to it on the training object surface, which involves a geometric computation. Hence, by selecting for high fitness, increasingly accurate feature extraction results as the networks evolve. Note that, to increase the speed of the evolutionary learning, data from only a random subset of the whisks can be evaluated for each network on each fitness evaluation.

Once the network has been appropriately trained, it can be used to extract the morphology of any arbitrary "test object" 415. The test object 415 can have a more simple surface complexity than the training object 410, or it can have a surface complexity similar to that of the training object 410. An example of a "test" object 415 is shown on the right side of FIG. 4, in this case, a small sculpted head. So long as the training object possesses a large enough variety of surface features, similar feature extraction accuracy can be observed on the test object 415.

Figure 5:
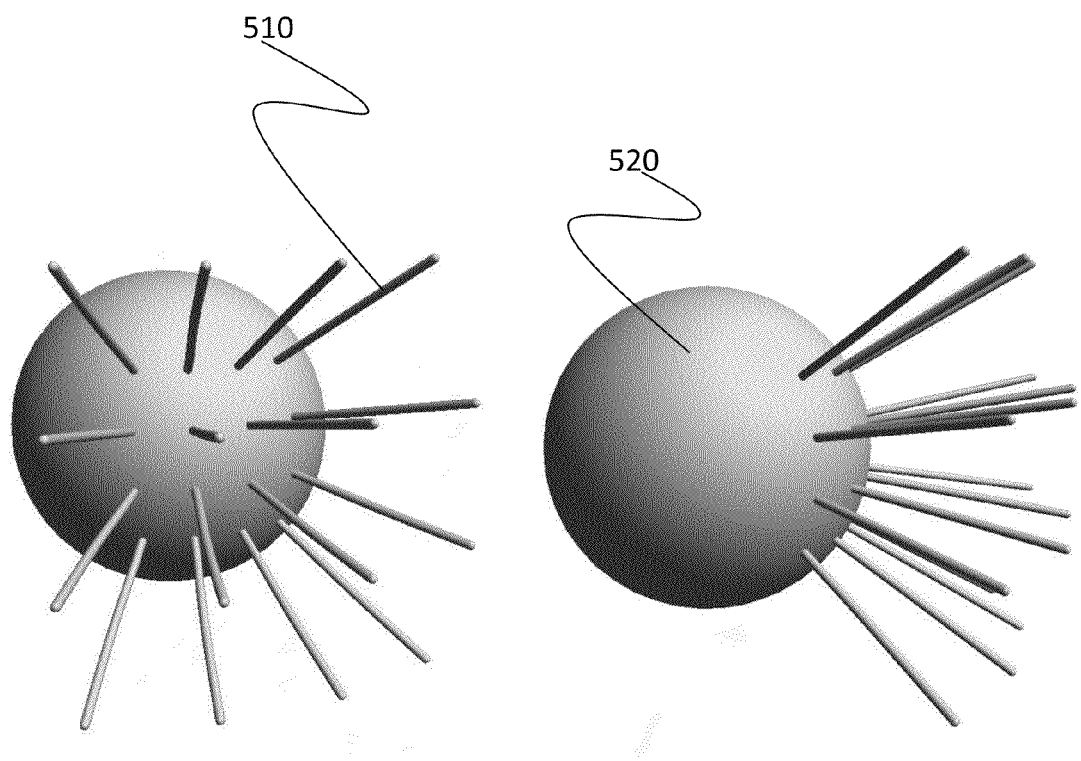
FIG. 5 shows an example whisker sensor array.

In an example, whisker-based 3-D surface reconstruction is enabled by training neural networks to generate estimations of 3-D contact point locations between a simulated array of whiskers and a randomly shaped test object, as the array brushes against the surface in an unpredictable way. The whisker array, shown, for example, in FIG. 5, includes a 4×4 configuration of straight, cylindrical whiskers 510, mounted on a spherical base (e.g., the "snout") 520.

In an example training process, two objects are involved: one object for gathering data to train the neural networks, and one object for evaluating the spatial accuracy of the networks in estimating contact points. The objects 610, 620, shown in FIG. 6, are generated using a smoothed, 2-D version of a "random walk" algorithm, giving them smoothly-varying, unpredictable contours.

Figure 6:
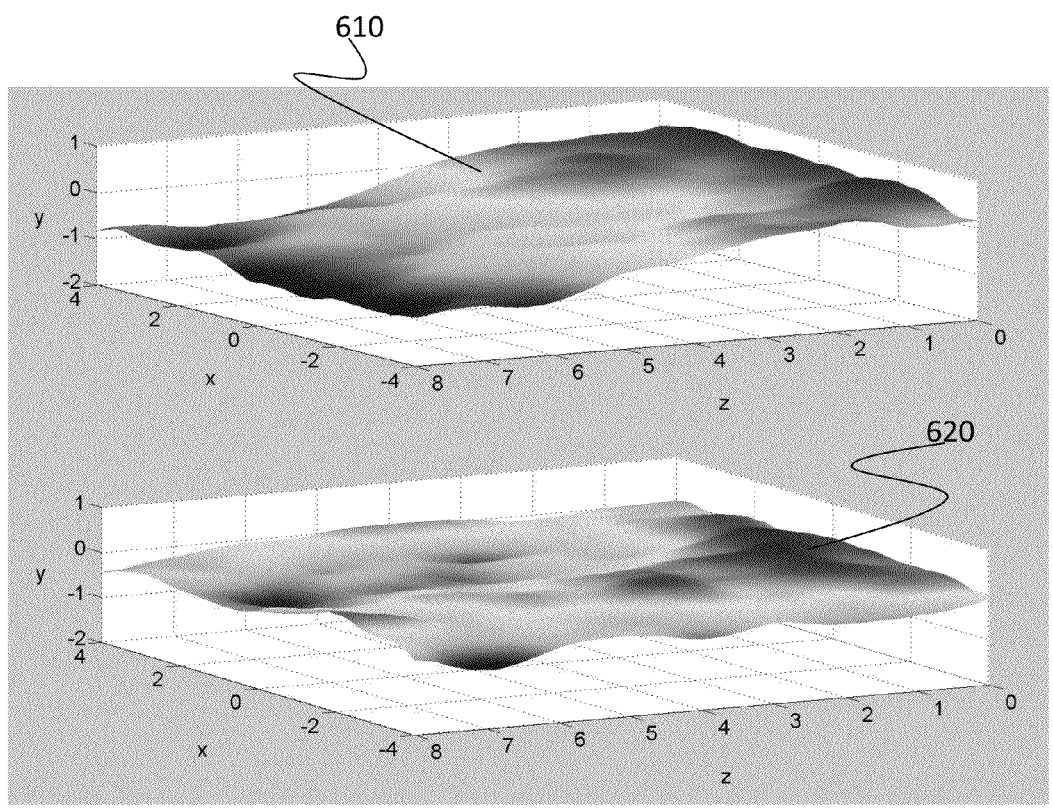
FIG. 6 depicts heightfields representing training and test objects.

As shown in the example of FIG. 6, heightfields are shown representing a training (top) object 610 and a test (bottom) object 620. The axes are in units of whisker length. Color scales with the y-value.

Movement trajectories of the whisker array are similarly generated using a smoothed, range-constrained, one-dimensional (1-D) version of the random walk algorithm. Six movement trajectories, shown in FIG. 7, are generated for both objects, and are interpreted as the (X, Y, Z) position 710 and ($\Theta$, $\Phi$, $\Psi$) Euler angles 720 describing a center of the snout.

Figure 7:
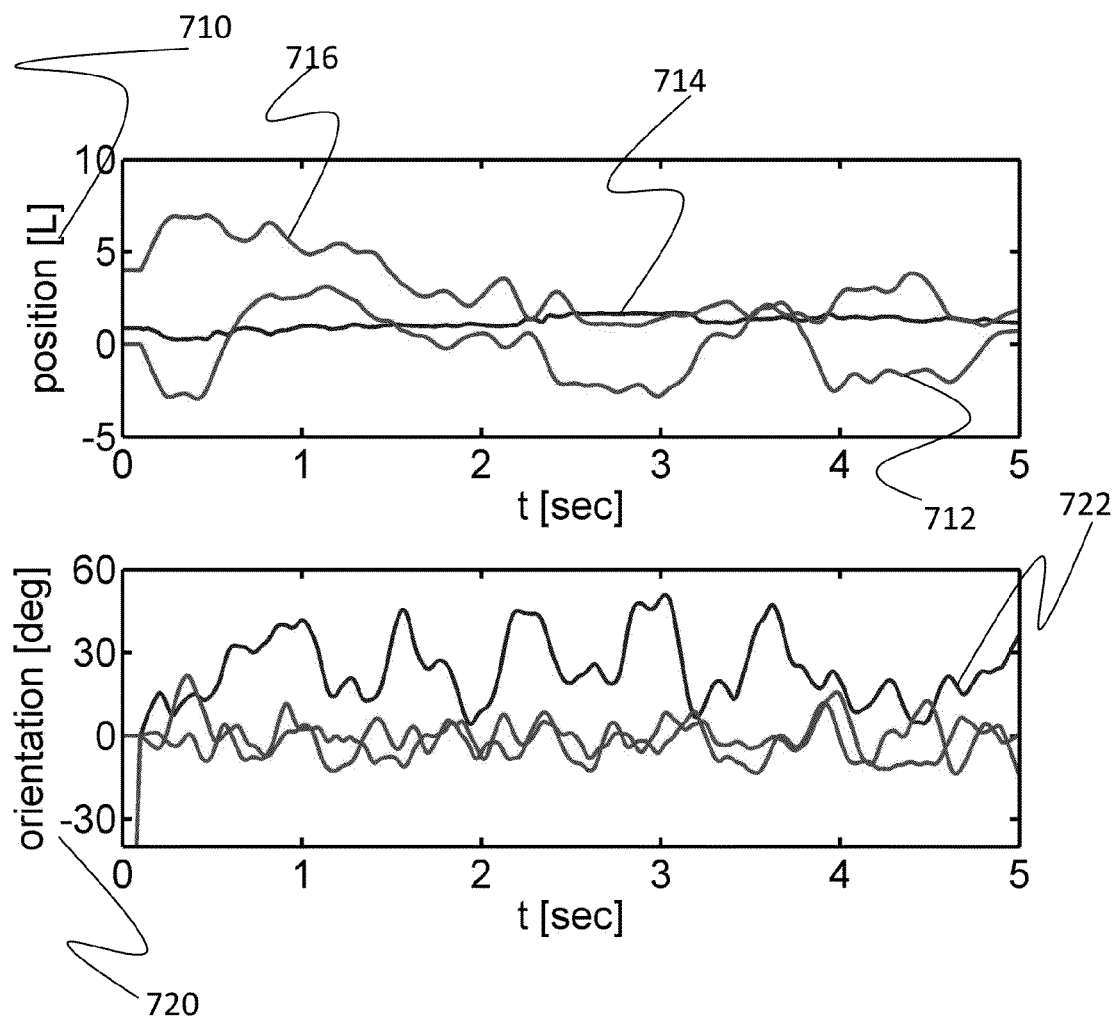
FIG. 7 shows whisker array trajectories for a training object.

FIG. 7 depicts an example whisker array trajectory for a training object. The trajectory 710 of whisker array position includes a green trace indicating an x-position 712, a blue trace indicating a y-position 714, and a red trace indicating a z-position 716. Position is normalized by whisker length. The trajectory 720 of whisker array orientation is measured in terms of three Euler angles. A blue trace 722 represents an angle about the tangent to the whisker base.

In an example, simulations are programmed using a simulator such as Open Dynamics Engine (ODE), which is an industrial quality, open-source multi-body dynamics modeling software package. Simulations can be run using any dynamics software, for example. Additionally, these algorithms apply equally well to data obtained from a hardware array of whiskers.

Figure 8:
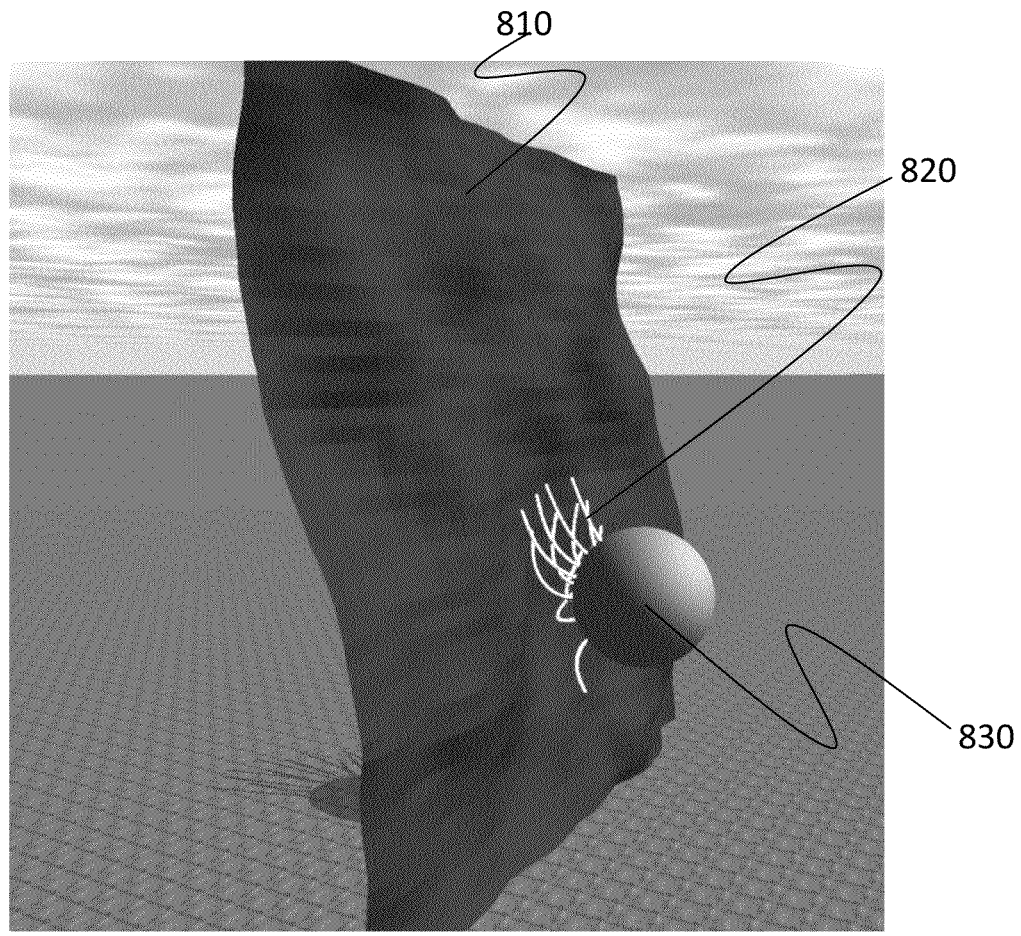
FIG. 8 illustrates a simulated whisker array brushing against a training object in Open Dynamics Engine simulator.

FIG. 8 shows the array 830 as it moves along a surface of a training object 810. In the example of FIG. 8, whiskers 820 are programmed using a series of ten capped cylinder geometries, connected with spring-damper elements to simulate the inherent stiffness and damping characteristics of the whisker material.

A Contact Point Estimation (CPE) algorithm, as implemented in the example of FIG. 8, works as follows. On each time step t and for each whisker w, the location of a contact point is estimated in spherical coordinates ($r_{w,t}$, $\theta_{w,t}$, $\phi_{w,t}$) relative to the base of the associated whisker, where r is the distance from the whisker base to the contact point, $\theta$ is the "inclination" angle of the contact point (measured relative to the whisker's local x-axis, which is tangent to the whisker at its base), and $\phi$ is the "azimuth" angle. Using a known position and orientation of a snout, these local spherical coordinates are converted to the laboratory frame to give the absolute contact point location ($x_{w,t}$, $y_{w,t}$, $z_{w,t}$).

The algorithm also outputs a "confidence" value $C_{w,t}$ between −1 and 1 that is associated with the contact point. If the confidence is less than zero, the contact point is ignored. Otherwise the contact point is retained, along with its associated non-unity confidence. The justification for using the confidence value is two-fold:

1. Often, the whisker is not in contact with an object surface, and this condition must be detected (e.g., $C_{w,t}$<0) such that no contact point is inferred.
2. Under certain contact conditions, the precise location of a contact point may be difficult to consistently determine with high accuracy; $C_{w,t}$ will thus indicate the reliability of the associated contact point.

In certain examples, Multi-layer Perceptron (MLP) neural networks are used to generate estimates for $r_{w,t}$, $\phi_{w,t}$ and $C_{w,t}$. The particular inputs for each of the networks is described in Table 1, where $$M_{yz} = \sqrt{M_y^2 + M_z^2} \quad (1)$$

is a combined magnitude of the two primary components of moment, $F_x$ is the axial force magnitude, and the bias is a constant unity input. Feedback connections from the outputs nodes to the hidden nodes were also used, allowing the networks to integrate past sensory information.

TABLE 1

| | Neural network input variables for each of the three networks (r, $\phi$, C). | | | | |
|---|---|---|---|---|---|
| | $M_{yz}$ | $F_x$ | $\dot{M}_{yz}$ | bias (1) | feedback |
| r | X | X | | X | X |
| $\phi$ | X | X | | X | X |
| C | X | X | X | X | X |

The inclination angle $\theta$ does not involve a neural network because, in most contact situations, the whisker deforms primarily within a plane, whose orientation can be analytically computed using $$\theta = a\tan 2(M_z, M_y). \quad (2)$$

where a tan 2 is the four quadrant arctangent of the elements of $M_z$ and $M_y$. Further accuracy can be obtainable using a neural network to refine this analytic approximation.

The neural networks for r and $\phi$ use $M_{yz}$, $F_x$ and the bias as inputs based on analytic results regarding the end-loaded, tapered cantilever problem (e.g., with zero inclination of the contact force), which indicate that the mappings from ($M_{yz}$, $F_x$) to r and to $\phi$ are surjective functions. Although some assumptions of the analytic model may be violated in practice (e.g., the whiskers possess intrinsic dynamic properties, and the presence of friction and the possibility of contact along the whisker tips lead to violation of the assumption regarding non-zero inclination of the contact force), cases where the contact point locations are overly ambiguous can be ignored through the use of the confidence metric. The confidence network additionally uses $\dot{M}_{yz}$ as an input to exploit the context-dependent correlation between $\dot{M}_{yz}$ and the presence of object contact.

All inputs to the network were normalized (using an affine transform) to the range [−1 1] based on minimum and maximum values of the training data. Similarly, the r and $\phi$ network outputs are affinely transformed to the ranges of [0 L] and [−π π], where L represents the length of the whisker (e.g., units are arbitrary).

In an example, a total of eight hidden nodes were used for each of the MLP networks, yielding a total of 152 network weights to be tuned. For example, a real-valued genetic algorithm (GA) can be used for tuning of the network weights with the following attributes: population size=200, number of generations=400; initial population uniformly distributed within [−1 1]; Gaussian mutations, with standard deviation=0.02; uniform crossover; rank-based fitness selection, with the top 20% offspring surviving; and no elitism.

A fitness function can be defined as $$f = \frac{1}{n}\sum_{i=1}^{n}(\delta_{tol} - \delta_i) \quad (3)$$

where n is a number of contact points with $C_i>0$, $\delta_i$ is a Cartesian distance between estimated and actual contact point, and $\delta_{tol}$ is the "error tolerance." Note that a given contact point will contribute to a positive fitness only if its error is less than the error tolerance; otherwise it will decrease the fitness. This is designed to reward/penalize a given contact point according to its degree of accuracy/inaccuracy. Setting $\delta_i$ too low can result in a large percentage of the contact being ignored (small n), and setting it too high can result in inaccurate contact points (large $\delta_i$) being retained.

In certain examples, a supervised learning approach can also be applied to neural network training in many cases, but could complicate the training of neural networks with recurrent connections.

Figure 9:
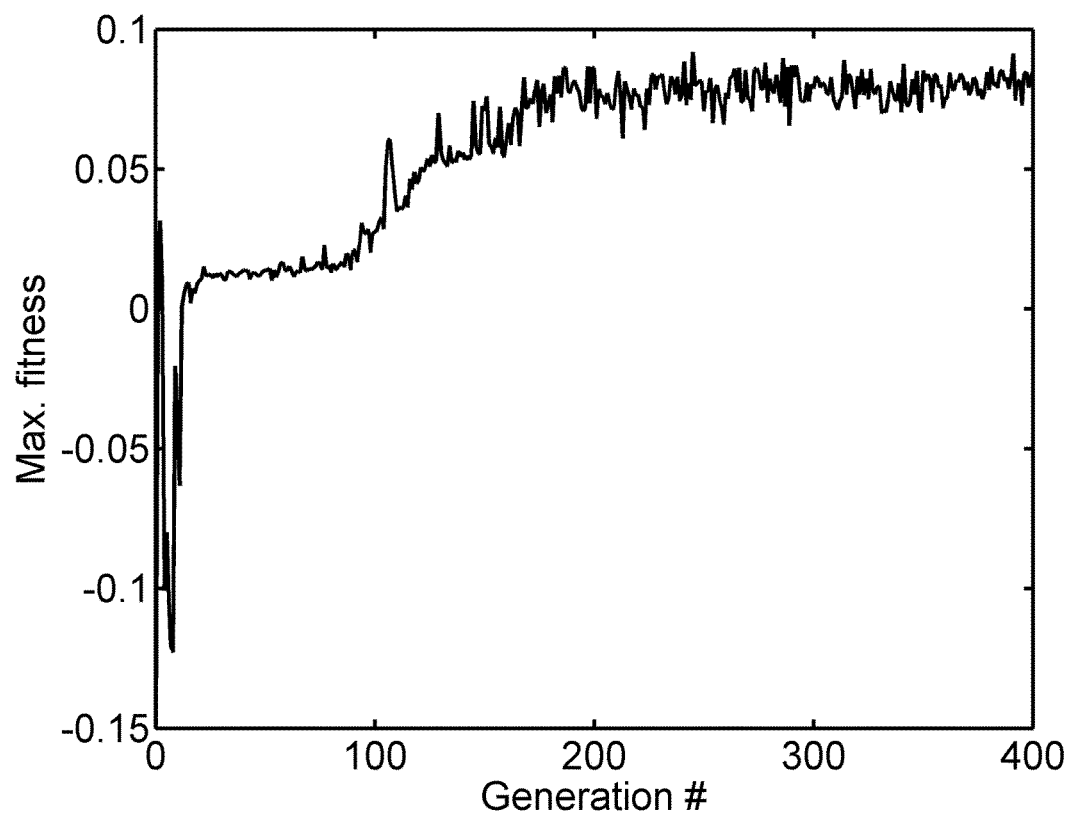
FIG. 9 shows example contact point extraction results from a real-valued genetic algorithm.

An example resulting run of the GA is plotted in FIG. 9. As shown in FIG. 9, fitness values quickly increase over the first 200 generations and then start to plateau. For the best individual of the final generation of the run, the average contact point error was 7.3%, and 29% of the contact points were evaluated. To confirm that the amount of training data was sufficient to allow the network performance to generalize to new objects, the best individual of the final generation was also tested on the test object, yielding 12.2% error and 26% of the contact points evaluated. This accuracy is within acceptable limits for many applications. Additionally, certain examples can refine the structure and training of the neural networks, incorporate sensor velocity and snout movement information, and/or hybridize the neural networks with an analytically derived model ("gray box" modeling), for example.

Thus, certain examples can apply to catheters and other objects at a variety of scales. Fluid flow, such as blood flow, can be capture around a whisker-based system, for example.

Certain examples include both long whiskers with significant dynamics (e.g., either tapered or not tapered), as well as short stubby hairs that serve more as proximity sensors. Either of those types of hairs (e.g., long or stubby) can be used to extract contours. Instead of or in addition to contour extraction, whisker arrays can be used for contact detection, proximity sensing, force measurement, and the like. Prediction of upcoming contours can be facilitated based on gathered data, for example.

In certain examples, the sensor array can be moved with respect to an object. In certain examples, the object can be moved respect to the whisker(s) of the sensor array. In certain examples, both the array and the object can be moved with respect to each other. Movement of the array can be arbitrary, for example.

Certain examples provide whiskers or other sensor members of various shape, in terms of both curvature profile and diameter profile. Array configurations can be arbitrary, for example. In certain examples, sensor member(s) can include deformable membrane surface(s) (skin) to which neural network techniques are applied. Such a membrane could be covered or embedded with sensors and the networks can learn to infer the surface shape from the sensor signals. In certain examples, an object can be coated with strain gages, and neural networks then learn to infer the object's surface shape (e.g., the object shape) based on the strain gage signals.

In certain examples, the scale and shape of the sensors, including total arc length, diameter profile (as a function of arc length), and curvature profile are not constrained. The scale and shape and configuration of the sensing array are also not limited. The presently described technology can work over any spatial scale. The number of sensors is not limited.

If the system has the capacity to measure the full 3-D force and moment at the base of the whisker and a single point contact is assumed, then the Euler-Bernoulli equation (starting from the base) can be incorporated to compute the full shape of the whisker and the location of the contact point.

The 3-D surface representation is not limited to any particular mathematical framework. Some possible options include 3-D contact point collections, tri-meshes, geometrical primitives, radial basis function network, artificial neuronal place cell firing rates.

Figure 10:
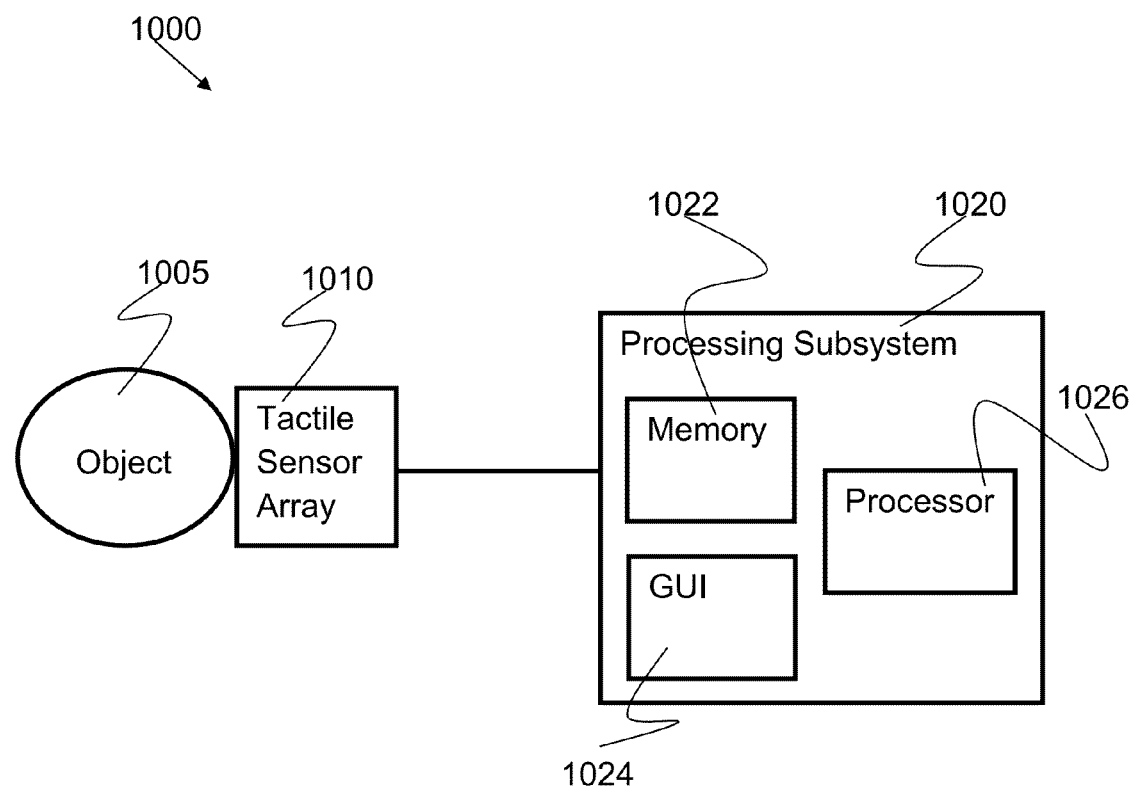
FIG. 10 illustrates an example 3-D reconstruction system to determine an object morphology and/or compliance using an array of tactile sensors.

FIG. 10 illustrates an example 3-D reconstruction system 1000 to determine morphology (e.g., size, shape, orientation, and/or position) and/or texture of an arbitrary object using an array of tactile sensors. The system 1000 includes an array of tactile sensors 1010. The array 1010 is in communication with a processing subsystem 1020 to transfer data obtained by the array of sensors 1010 in contact with an object 1005 to the processing unit 1020.

The processing subsystem 1020 includes a memory 1022, an interface 1024, and a processor 1026. Data from the sensor array 1010 can be stored in the memory 1022, output via the interface 1024, and processed by the processor 1026. The processor 1026 can be used to train the sensor array 1010 and/or one or more neural network(s) and/or other processing systems/structures associated with the processor 1026. The processor 1026 can also be used to provide a 3-D reconstruction with respect to an object 1005 in contact with the sensor array 1010. Processing can involve passing sensor input data through one or more neural networks and/or other analytics/numerical analysis, such as Multilayer perception, with or without feedback; Radial basis function (RBF) network; Hopfield network; Elman network; Stochastic neural network; Continuous time recurrent neural network; Topology and Weight Evolving Artificial Neural Network (TWEANN); Compositional Pattern Producing Network (CPPN), etc. Analytic and/or numerical approaches can also be "hybridized" into a neural network framework, by using their outputs as network inputs (e.g., "features"). The neural network(s) can process sensor input data using a Contact Point Estimation algorithm, as described above, or other similar method to determine coordinates for points of contact by sensors 1010 against the object 1005. The 3-D reconstruction can include a 3-D morphology (e.g., size, shape, orientation, and/or position) and/or texture, for example. The 3-D reconstruction can be displayed, saved, forwarded to another recipient, and the like.

Figure 11:
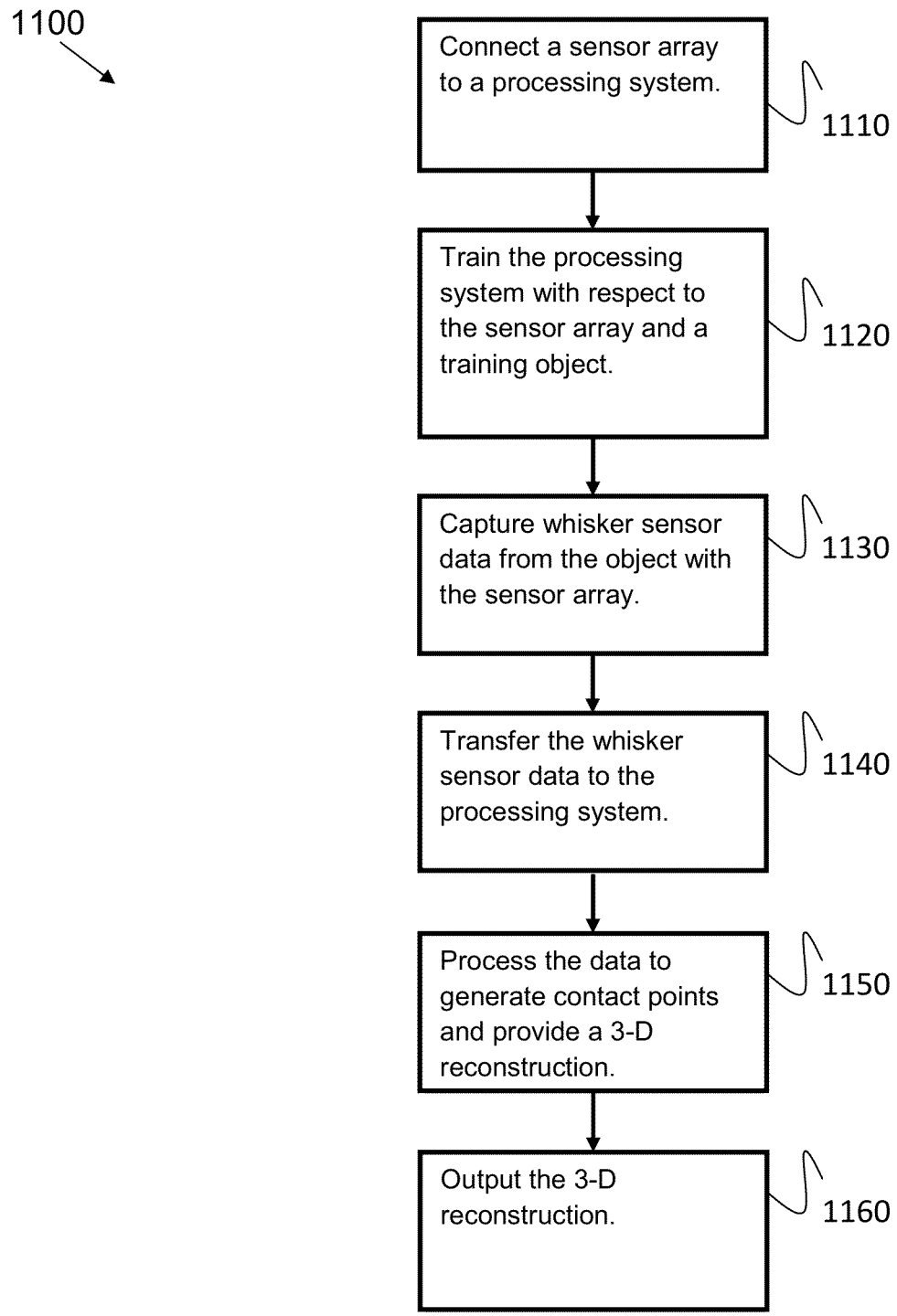
FIG. 11 illustrates a flow diagram for an example method for 3-D object reconstruction.

FIG. 11 illustrates a flow diagram for a method 1100 for 3-D object reconstruction. FIG. 11 depicts an example flow diagram representative of processes that can be implemented using, for example, computer readable instructions that can be used to facilitate 3-D reconstruction. The example processes of FIG. 11 (and of other figures, such as FIG. 2) can be performed using a processor, a controller and/or any other suitable processing device. For example, the example processes of FIG. 11 can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example processes of FIG. 11 can be implemented using coded instructions (e.g., computer readable instructions) stored on a non-transitory computer readable medium such as a flash memory, a read-only memory (ROM), a random-access memory (RAM), a CD, a DVD, a Blu-ray, a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example processes of FIG. 11 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example processes of FIG. 11 can be implemented manually or as any combination(s) of any of the foregoing techniques, for example, any combination of firmware, software, discrete logic and/or hardware. Further, although the example processes of FIG. 11 are described with reference to the flow diagram of FIG. 11, other methods of implementing the processes of FIG. 11 may be employed. For example, the order of execution of the blocks can be changed, and/or some of the blocks described may be changed, eliminated, sub-divided, or combined. Additionally, any or all of the example processes of FIG. 11 can be performed sequentially and/or in parallel by, for example, separate processing threads, processors, devices, discrete logic, circuits, etc.

At 1110, a tactile sensor array is connected to a processing system for 3-D reconstruction of an object. For example, a whisker or fiber-based array of sensors is connected to a computer to receive and process tactile sense data.

At 1120, the processing system is trained to operate with the sensor array with respect to a training object. For example, a neural network associated with data gathered from the sensor array is trained.

At 1130, tactile sensor data is captured by the sensory array in contact with an object to be reconstructed. For example, data points corresponding to contact between whiskers in an array and a human face is captured by the sensor array.

At 1140, the tactile sensor data is transferred to the processing system from the sensor array. At 1150, the gathered contact data is processed to generate contact points and provide a 3-D reconstruction with respect to the object. Processing can involve passing sensor input data through one or more neural networks and/or other analytics/numerical analysis, such as Multilayer perception, with or without feedback; Radial basis function (RBF) network; Hopfield network; Elman network; Stochastic neural network; Continuous time recurrent neural network; Topology and Weight Evolving Artificial Neural Network (TWEANN); Compositional Pattern Producing Network (CPPN), etc. Analytic and/or numerical approaches can also be "hybridized" into a neural network framework, by using their outputs as network inputs (e.g., "features"). The neural network(s) can process sensor input data using a Contact Point Estimation algorithm, as described above, or other similar method to determine coordinates for points of contact by sensors against the object. The 3-D reconstruction can include a 3-D morphology (e.g., size, shape, orientation, and/or position) and/or texture, for example. At 1160, the 3-D reconstruction of the object is output. The 3-D reconstruction can be displayed, saved, forwarded to another recipient, and the like.

Certain examples provide detection of a two- and/or three-dimensional surface topography using flexible sensors such as wires, hair sensors, etc. In certain examples, a sweeping mode algorithm allows for large scale mapping using a relatively small sensor. Compliance mapping allows for testing of both material surface as well as surface strength/elastic modulus, for example. In certain examples, texture mapping can be performed with compliance mapping, and compliance/texture estimates can be overlaid on an object surface.

Certain examples provide a method of determining surface topography. The example method includes receiving a set of 2-D moment and 1-D force input data from known topographies. While 2-D moment and 1-D force input data are used in the example, it is understood that this is for the purpose of illustration only and other dimensional sets of moment and/or force input data (e.g., 1-D, 2-D, and/or 3-D) are also applicable. The example method uses a neural network system to receive input from a training data set based on known topography wherein the network weights are optimized via an Evolutionary Algorithm that tests vectors of candidate network weights, using a fitness function, such as the fitness function of Equation (3) or, in certain examples:

$$f = \frac{1}{N_{test}} \sum_{i=1}^{N} \sigma_{surf,i}, \qquad (4)$$

wherein $\sigma_{surf,i}$ represents a distance between a splined surface and an actual surface for test point i and wherein $N_{test}$ represents a number of tests (e.g., test points) on the spline surface based on a number of outputs. Using Equation (4), a surface can be splined and a number of test points selected using a heuristic (e.g., a grid, etc.). A tolerance can be hand-tuned based at least in part on a tradeoff between an acceptable error and a number of contact or test points that are to be discarded due to a lack of confidence in their accuracy.

Certain examples provide a method to determine material compliances. The example method includes receiving a set of 2-D moment and 1-D force input data from known topographies and compliances. The example method includes using a neural network system to produce a training set data based on known topography and compliances, wherein compliance is defined as the change in surface compression per change in contact force, dp/dF. The example method includes receiving a 2-D moment and force input and comparing it with the training set to form a local topographic and compliance mapping.

Certain examples provide a method of rapid and precise 3-D surface mapping and simultaneous compliance mapping using an array of whiskers and/or other wire-based sensors. In certain examples, an incremental spatial registration procedure can be optionally used to obviate use of absolute position and orientation measurement of the whisker/sensor array. The array may move in a variety of motion patterns. For example, both translation and rotation can be arbitrary 3-D trajectories.

An example method provides that, for an inherently straight, linearly tapered whisker in frictionless, point-contact with an object, there is a unique mapping from an axial force ($f_x$) and a 2-D moment vector ($M_y$, $M_z$) at the whisker base to the relative position of the contact point (CP), expressed in spherical coordinates: ($r_{CP}$, $\theta_{CP}$, $\phi_{CP}$). An example method also works, albeit with reduced accuracy, when only moment is sensed at the whisker base and/or the whisker is cylindrical in cross section instead of tapered.

Using repeated samplings with these measurements, a "compliance map" can be generated that estimates the compliance (e.g., resistance to compression) of the object surface as a function of position. Incremental spatial registration of extracted surface segments allows reconstruction of 3-D surface features without the need for accurate "dead reckoning" or positional measurements in a fixed laboratory frame.

Because whiskers possess no sensors along their length, the locations of whisker/object contact are inferred based on torque and/or force information from sensors embedded at the whisker base, perhaps in combination with information relating to whisker movement. Contact point (CP) determination can be accomplished using whisker tapping and/or sweeping. Tapping methods are characterized by the whisker rotating and/or translating by a "small" amount beyond initial object contact, where the "small" constraint is observed to allow use of a linearized cantilever beam model. Sweeping methods involve the whisker moving significantly beyond initial contact, usually leading to a continuous contour of the object (or sequence of CPs) being sampled, and hence allowing shape information to be gathered much more rapidly.

Although tapping approaches generally cannot gather CPs as rapidly as sweeping approaches and rely on constrained movement patterns, they usually entail modest sensing requirements (e.g., torque only; not force) and involve simple, analytic equations. In contrast, sweeping approaches can potentially collect CPs much faster, but suffer from other drawbacks. For example, some sweeping methods involve relatively simple sensors and permit estimation of a sequence of CPs through sweeping, their reliance on tip contact is a severe constraint. In certain example, a large-angle cantilever beam model and a sensor that can measure 2-D force and/or 3-D force and 1-D and/or 3-D moment are used to enable more accurate estimation of the CP in 3-D under arbitrary bending conditions. As discussed above, certain examples utilize a large-angle cantilever beam model and a 1-D moment sensor to accomplish iterative CP estimation in 2-D.

Certain examples provide a method utilizing sweeping of sensors to identify contact points without placing constraints on a type of object contact and/or a movement pattern of the whisker. Random movement profiles are generated such that a sensor array is randomly moved to gather force and movement data. The example method works in 2-D and/or 3-D and involves relatively minimal sensing requirements. In an example, a 2-D model of a cantilever beam undergoing large-angle, frictionless, point-load deflections can be used to show that if the cross-section linearly tapers from base to tip, the CP position can be uniquely inferred based on a tapered beam (e.g., with $r_{tip}/r_{base}$=0.2) is gradually deflected until an angle of the beam (with respect to the line tangent to the whisker base) at the CP is 90°. For each radial distance, the moment gradually increases as the contact force increases. Plotting radial distance $r_{CP}$ and deflection angle $\theta_{CP}$ as functions of axial force and moment provides unique surjective mappings–$(F_x, M_{abs}) \rightarrow r_{CP}$ and $(F_x, M_{abs}) \rightarrow \theta_{CP}$–sufficient for determination of the CP position.

In certain examples, the 'moment and axial force map' method described above is extended to 3-D. An absolute moment is computed from two individual components of moment as $$M_{abs} = \sqrt{M_y^2 + M_z^2} \qquad (5),$$

which, when used along with $F_x$, allows use of the force/moment maps to compute $r_{CP}$ and $\theta_{CP}$. Given that the whisker is straight and assumed to be undergoing deflection by a discrete, frictionless load, it follows that the whisker will deflect entirely within a plane, the orientation of which can be computed as $$\phi_{CP} = a\tan(M_y/M_z) \qquad (6).$$

Equation 6 accounts for an azimuthal angle used to describe the 3-D position of the CP relative to the base in spherical coordinates ($r_{CP}$, $\theta_{CP}$, $\phi_{CP}$). Given a position and orientation of the whisker base, local spherical coordinates can be converted to a global, Cartesian frame using transformation matrices.

In practice, whisker/object contact conditions frequently violate assumptions inherent in the numerical model used to generate the CP mappings, including zero friction, no inertial effects, and point-contact (e.g., often a continuous segment of the whisker is in contact with the object). As a result, the numerically-derived CP mappings are suboptimal, do not cover the entire range of ($F_x$, $M_{abs}$) values that may be experienced, and can be improved using a data-driven machine learning approach in effort to maximize spatial accuracy. To this end, CP mappings can be learned using neural networks as function approximators. For example, an evolutionary algorithm can be used to tune neural network parameters with a goal of minimizing an average spatial error between extracted CPs and the true object surface.

Multilayer perceptron (MLP) networks and radial basis function (RBF) networks are two neural networks for function approximation, each with its own advantages and disadvantages. Briefly, MLP networks generally involve fewer parameters (activation weights) than RBF networks, but those parameters are generally more difficult to tune due to the existence of numerous local sub-optima.

As explained in the previous section, two neural networks can be used: one to represent the mapping $(F_x, M_{abs}) \rightarrow r_{CP}$ and one for $(F_x, M_{abs}) \rightarrow \theta_{CP}$. Data to learn these mappings is gathered by brushing a whisker array against a "training" object, using similar movement patterns to those the array is expected to undergo in practice, on "test" objects. Also, types of contours that form the training object are to be representative of the contours forming the test objects.

Using the training data, a supervised approach can be applied to learn network weights (e.g., attempting to minimize or reduce a mean squared error of network outputs, $r_{CP}$ and $\theta_{CP}$). In certain examples, Cartesian errors (spatial distances) between estimated CPs and an object surface can be computed using an error metric. For example, discrepancies between actual and estimated CPs are tolerable as long as the estimated CPs tend to be close to the surface. The error metric, referred to as $\Delta_{surf,i}$ (where i is an index of the contact point), is thus easier to compute and also more "forgiving" such that for any given ($F_{x,i}$, $M_{abs,i}$), a continuous range of possible values for $r_{CP,i}$ and $\theta_{CP,i}$ leads to zero error (e.g., lies directly on the object surface). Computing the error in this manner involves a known shape, position and orientation of the test object, where test objects in the study are represented as tri-meshes.

Given this error metric—absolute distance to the object surface $\delta_{surf,i}$—a purely supervised learning approach may not be well-suited for optimizing the network weights because the "supervisory" (e.g., error) signal for any given input is non-unique, and, thus, minimizing an overall error (e.g., over all CPs) is not possible using a traditional supervisory algorithm. Instead, an Evolutionary Algorithm (EA) can be implemented to tune the network weights. In an EA, parameters can also evolve in relation to how a surface is splined (e.g., does a user want the EA to evolve strongly to capture every point on a surface or become more smoothed, etc.). Based on the principles of natural selection, EAs iteratively and selectively cull and then modify (e.g., through crossover and/or mutation) a population of candidate solutions (e.g., vectors of numbers), gradually leading to progressive improvement according to some error metric (e.g., a "fitness function"). In this example, candidate solutions are vectors of network weights, and, for the fitness function to measure a surface, a mean error is used:

$$\text{fitness} = \frac{1}{N}\sum_{i=1}^{N} \delta_{surf,i}, \quad (7)$$

where N is a number of CPs tested on a given fitness evaluation. Note that the error is not squared since this would increase sensitivity to outliers, and squaring the error is not required by the algorithm (as it is for other many other algorithms, such as back propagation).

Figure 12:
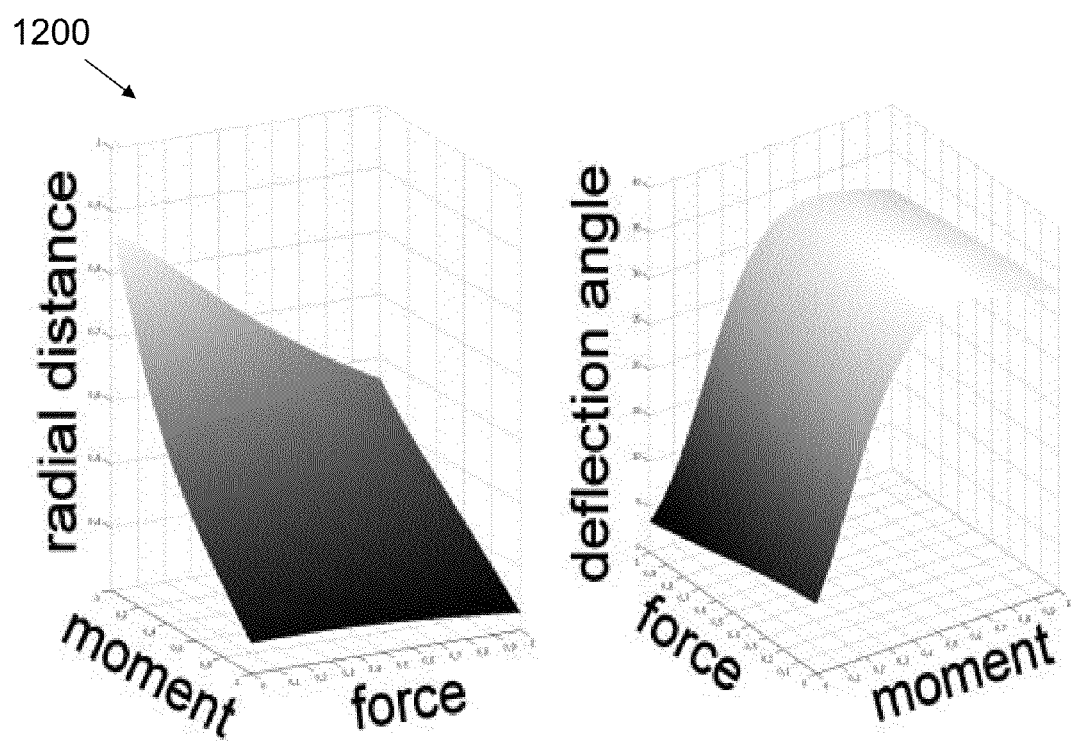
FIG. 12 depicts an example of learning neural network mappings for radial distance and deflection angle.

For example, using a four by four (4×4) array of whiskers allows several CPs to be sampled in parallel. Whiskers can be constructed from superelastic material such as Nitinol, for example. An example whisker array can be constructed using Nitinol that is 3 cm in length, 0.5 mm diameter at the base, with $r_{up}/r_{base}$=0.2, for example. The whisker can be arranged to protrude from a spherical support structure that is 2 cm in diameter, spaced apart in 15 degree increments, with each whisker's longitudinal axis intersecting the center of the sphere, for example. Movement trajectories of the array of a surface can be based on a random walk algorithm, for example. By adjusting step size and smoothing span parameters of the random walk algorithm, a frequency profile and surface curvature. In certain examples, neural networks can be trained for radial distance and deflection angle of the whisker array against a training surface. FIG. 12 depicts an example of learning neural network mappings for radial distance and deflection angle.

In certain examples, a spatial registration procedure can be used to perform robust 3-D feature extraction in the presence of positional uncertainty. Certain examples facilitate reconstruction of 3-D surface features of an object that is larger than the vibrissal array, without the need for accurate "dead reckoning" or positional measurements in a fixed laboratory frame. The example reconstruction method is based on three complementary insights.

First, the mappings between $(F_x, M_{abs}) \to r_{CP}$ and $(F_x, M_{abs}) \to \theta_{CP}$ do not involve information about vibrissal velocity. Second, during high-resolution (e.g., on the scale of single vibrissa) 3-D surface reconstruction, information about relevant features is provided in the relative positions of contact points across the vibrissal array. If the entire array moves as the vibrissae sample, spatial uncertainty (e.g., blur) may be introduced into the sensed contact points, but the uncertainty can be subtracted off by finding the common-mode signal between vibrissae. The problem of blur can be further ameliorated if the vibrissae sample the object quickly relative to the dynamics of the array. Data acquired on two separate "snap shots" (e.g., spaced apart by a small amount of time) can be aligned based on overlapping regions of high-resolution data. Effectively, the entire object can be constructed from numerous smaller mappings, accommodating for uncertainty in absolute position of the array as the array moves.

In certain examples, an approach for measuring object compliance provides an advantage of vibrissae over other spatial mapping technologies (e.g., vision). An object's "compliance map" is modeled similar to an object's spatial map, except that each contact point is also associated with a compliance value, which is defined as a rate of surface compression with respect to change in contact force, dp/dF. If it is assumed that each vibrissa contacts the object at a discrete point and that friction is negligible, then Euler-Bernoulli beam theory allows a contact force to be inferred. As the vibrissa array moves along the surface and varying contact forces cause the object to compress by varying amounts, a cloud of dp/dF values can be gathered and combined into an overall estimate of compliance. Although non-discrete contact, friction, and non-independent object deformations caused by nearby vibrissae may introduce some error into the measurement, it is possible to account for these issues using a data-driven machine learning approach, similar to that used in determining the contact point locations. Specifically, non-discrete contact and friction are accounted for implicitly as increasing amounts of data are gathered, while non-independent surface deformations are accounted for by using a neural network to learn a corrective function for the "effective" contact force at a given contact point that integrates the effects of neighboring contact forces. Mathematically, this can be thought of as determining an effective contact force from a sum of the force based on an underlying cantilever beam model, plus a correction factor for the combined effect of other vibrissae on the object's surface:

$$F_{eff,0} = F_{act,0} + \sum_{i=1:n} h(F_{act,i}, \delta_i) \quad (8)$$

In Equation 8, $F_{eff,0}$ is an "effective" contact force at a current contact point, $F_{act,0}$ is an "actual" contact force at the current contact point (e.g., based on a point-contact cantilever model), $h(F_{act,i}, \delta_j)$ is a neural network output for whisker i, $\delta_i$ is an estimated distance from the current contact point to contact point i, and n is a number of neighboring whiskers. A schematic showing how the $\delta_i$ are gathered is shown in FIG. 13.

Figure 13:
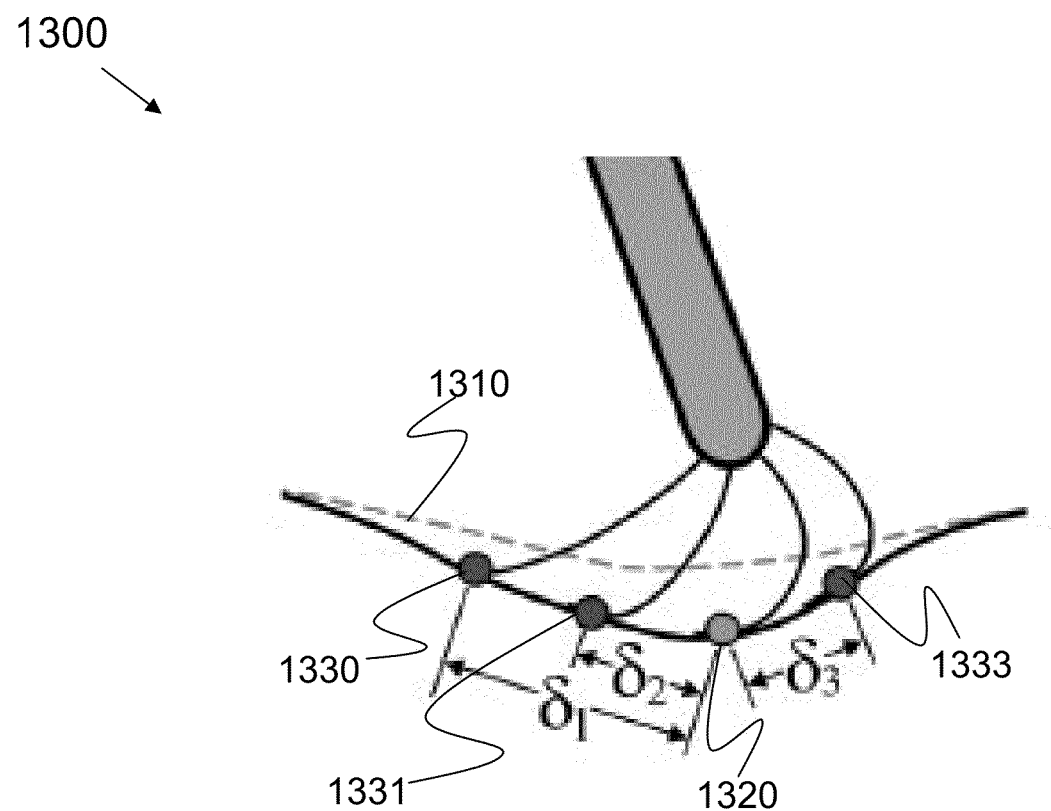
FIG. 13 illustrates an example of compliance mapping.

FIG. 13 illustrates an example of for compliance mapping. A dashed line 1310 represents an uncompressed surface. A green contact point 1320 is a "current" contact point for which an "effective" contact force is computed, and red contact points 1330-1332 represent other contact points, for example.

Thus, certain examples provide detection of surface topography using wires and/or other hair-like sensors. Certain examples employ a sweeping mode algorithm that allows for large scale mapping using a relatively small sensor. Certain examples facilitate compliance mapping for testing of both a material surface and surface strength/elastic modulus.

In certain examples, by gathering force and moment data on a "training" surface, neural network weights can be trained based on the "training" data using a fitness function (e.g., Equation (3)). A set of "testing" data can be gathered as the training data was gathered, but using a different "testing" surface. The testing data can be input to the trained neural network to generate a surface map, and the surface map is compared to the actual surface (e.g., applying the fitness function again) to provide a measure of the accuracy of the algorithm used to generate the mapping.

Figure 14:
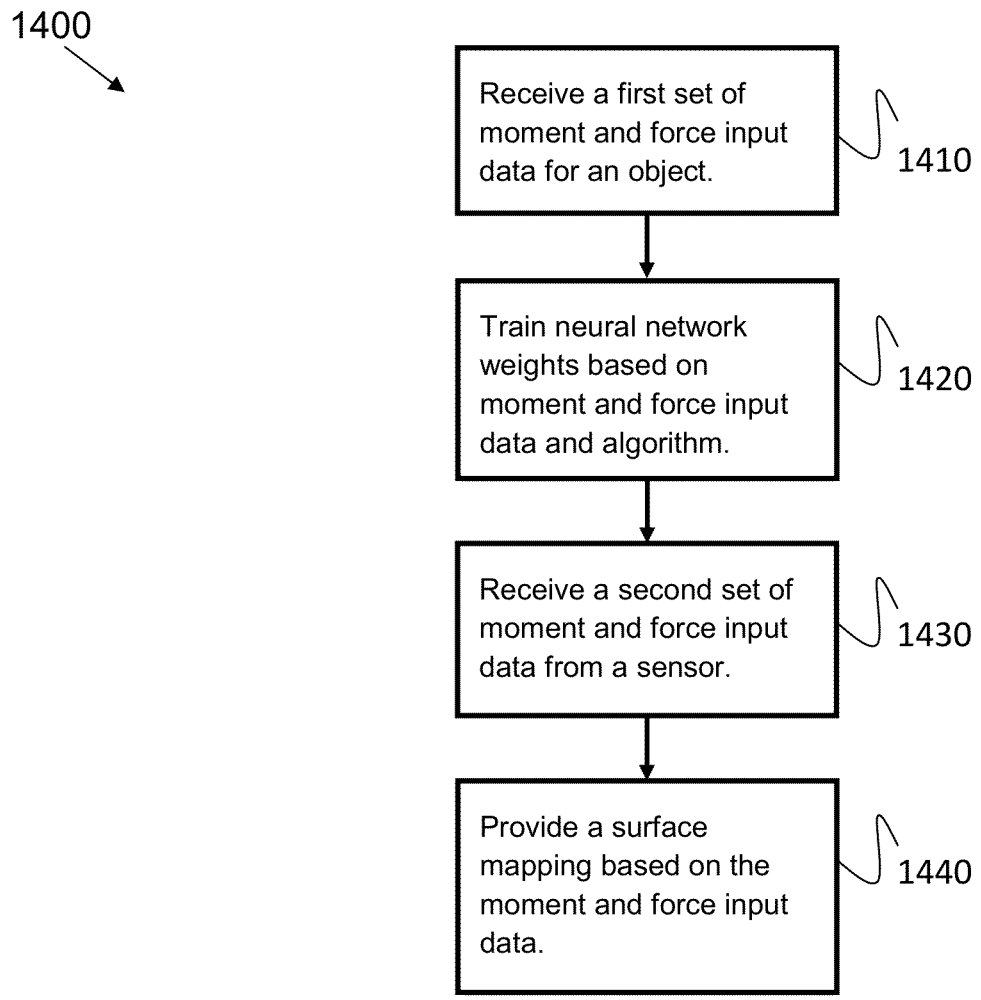
FIG. 14 illustrates a flow diagram for an example method for surface mapping.

FIG. 14 illustrates a flow diagram for an example method for surface mapping. A surface topography of an object can be determined as follows. At block 1410, a first set of moment and force input data (e.g., 2-D moment and 1-D force input data, etc.) for an object are received. The data can be provided from one or more known topographies, for example.

At block 1420, neural network weights are trained based on moment and force input data and an applied algorithm. For example, neural network weights are trained based on the moment and force input (training) data using an evolutionary algorithm and/or other optimization technique. A training set of data based on known topography, for example. Network weights can be optimized via an algorithm, such as an Evolutionary Algorithm, that tests vectors of candidate network weights, using a fitness function.

At block 1430, a second set of moment and force input are received from a sensor. For example, a whisker or other hair-like sensor array can provide moment and force input with respect to an object surface (e.g., 2-D moment and 1-D force input data, etc.). At block 1440, the second set of moment and force input data from the object surface is used to provide a surface mapping of the object. For example, local topographic mappings are compared to form a combined mapped surface.

Figure 15:
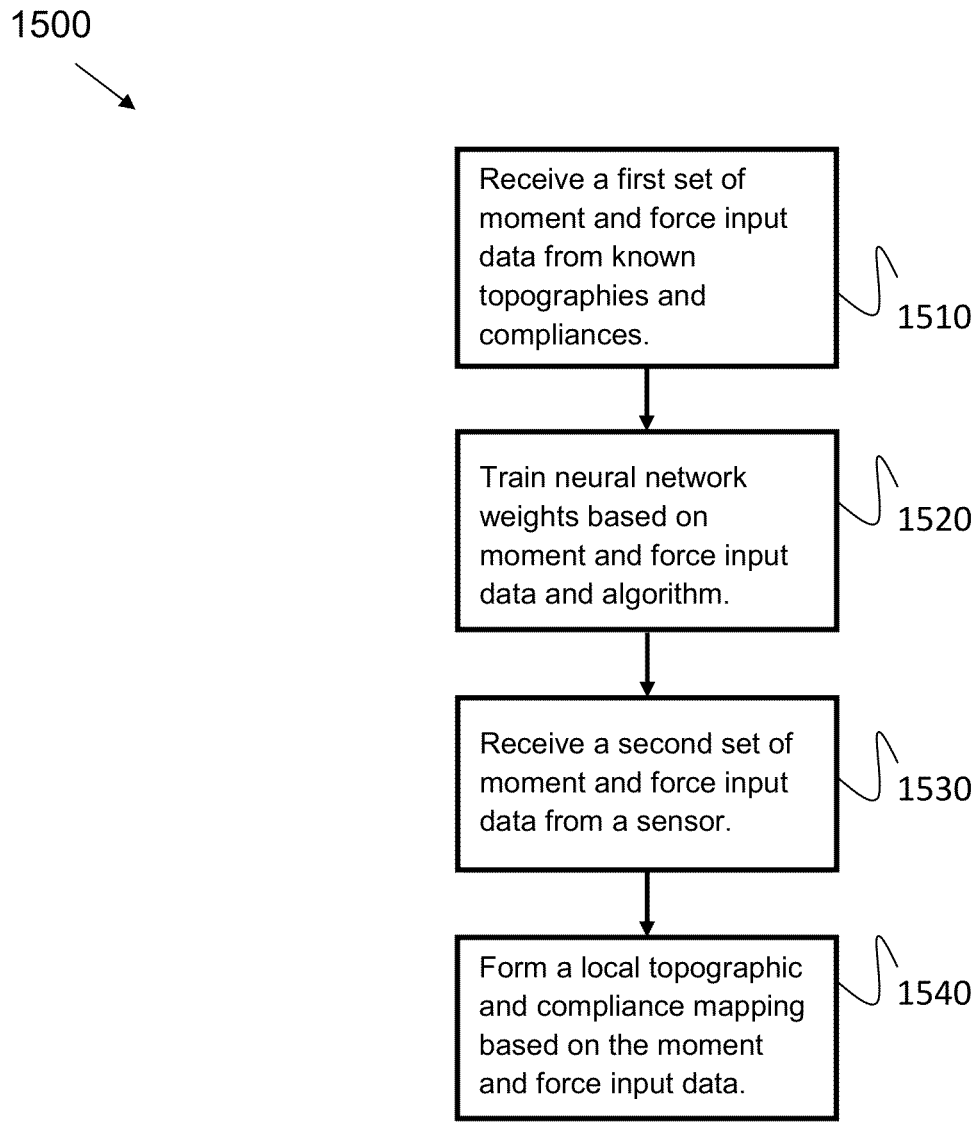
FIG. 15 illustrates a flow diagram for an example method for determining material compliance.

As illustrated in FIG. 15, material compliance(s) can also be determined. At block 1510, a set of moment and force input data (e.g., 2-D moment and 1-D force input data, etc.) from known topographies and compliances is received. At block 1520, neural network weights are trained based on moment and force input data and an applied algorithm. For example, neural network weights are trained based on the moment and force input (training) data using an evolutionary algorithm and/or other optimization technique. The training data can be produced based on known topography and compliances, for example. Compliance is defined as a change in surface compression (distance) per change in contact force, dp/dF, for example. At block 1530, a second set of moment and force input is received from a sensor. For example, a whisker or other hair-like sensor array can provide moment and force input with respect to an object surface (e.g., 2-D moment and 1-D force input data, etc.). At block 1540, the moment and force input is used to form a local topographic and compliance mapping.

Thus, certain examples detect compliance and output a 2-D and/or 3-D surface map of an object.

Certain example applications include pipes and conduits across multiple industries (gas, oil, water, electrical) are subject to corrosion and micropits as small as 200 um. It is important to detect these defects before problems occur. Defects can run either axially or longitudinally, and their small size can be particularly difficult for electromagnetic or ultrasound technologies to detect. Tactile whisker arrays can potentially serve as an effective technology for finding these defects. Several forms of medical surgery, both minimally-invasive and robotically-assistive, could benefit greatly from 3D spatial and compliance mapping technology provided by tactile whiskers. The ability to locate micro-cracks and surface variations in desert rocks would be if interest to interplanetary geologists looking for clues of ancient microbial life on Mars.

Figure 16:
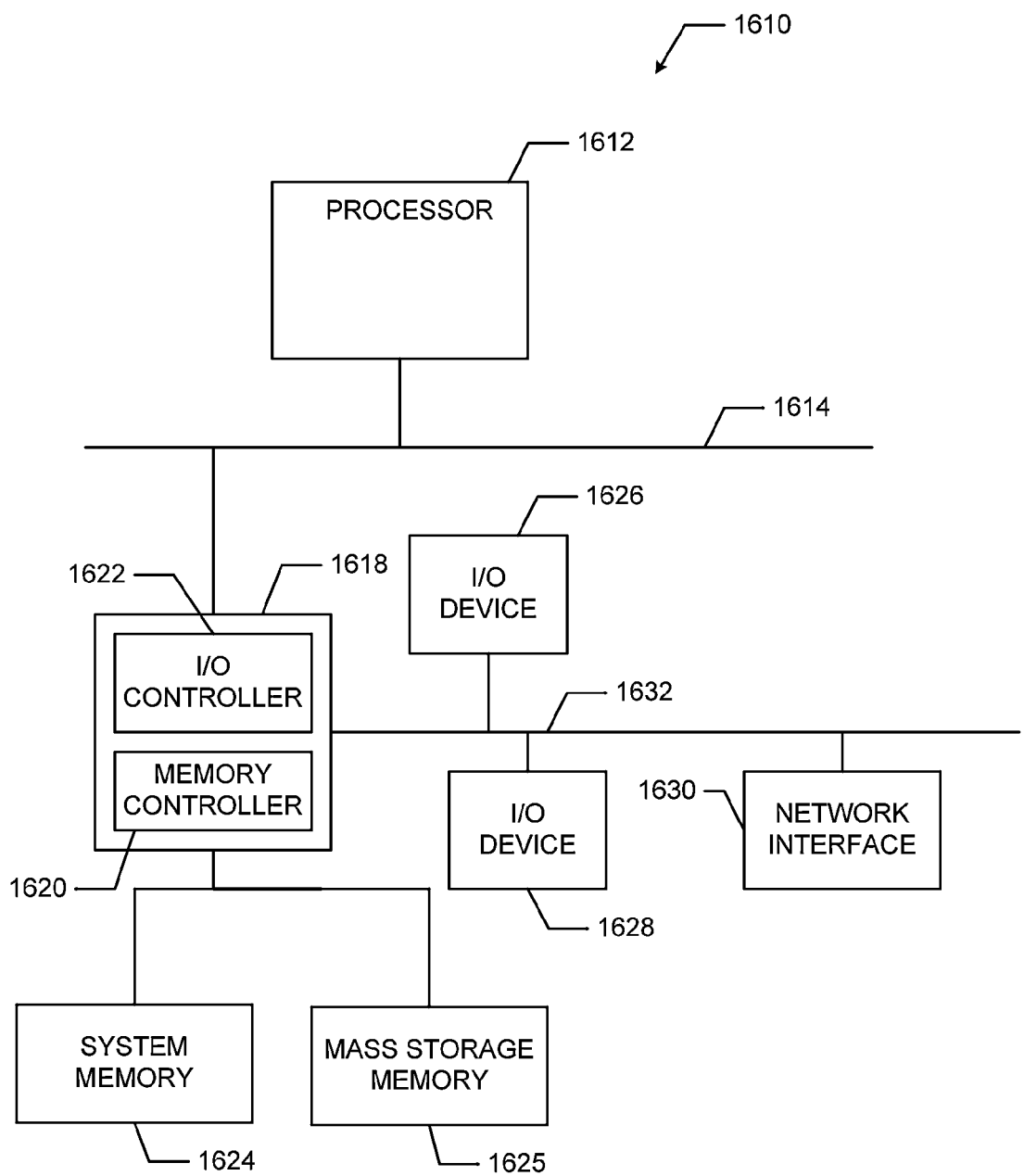
FIG. 16 is a block diagram of an example processor system that can be used to implement systems, apparatus, and methods described herein.
Figure 12:
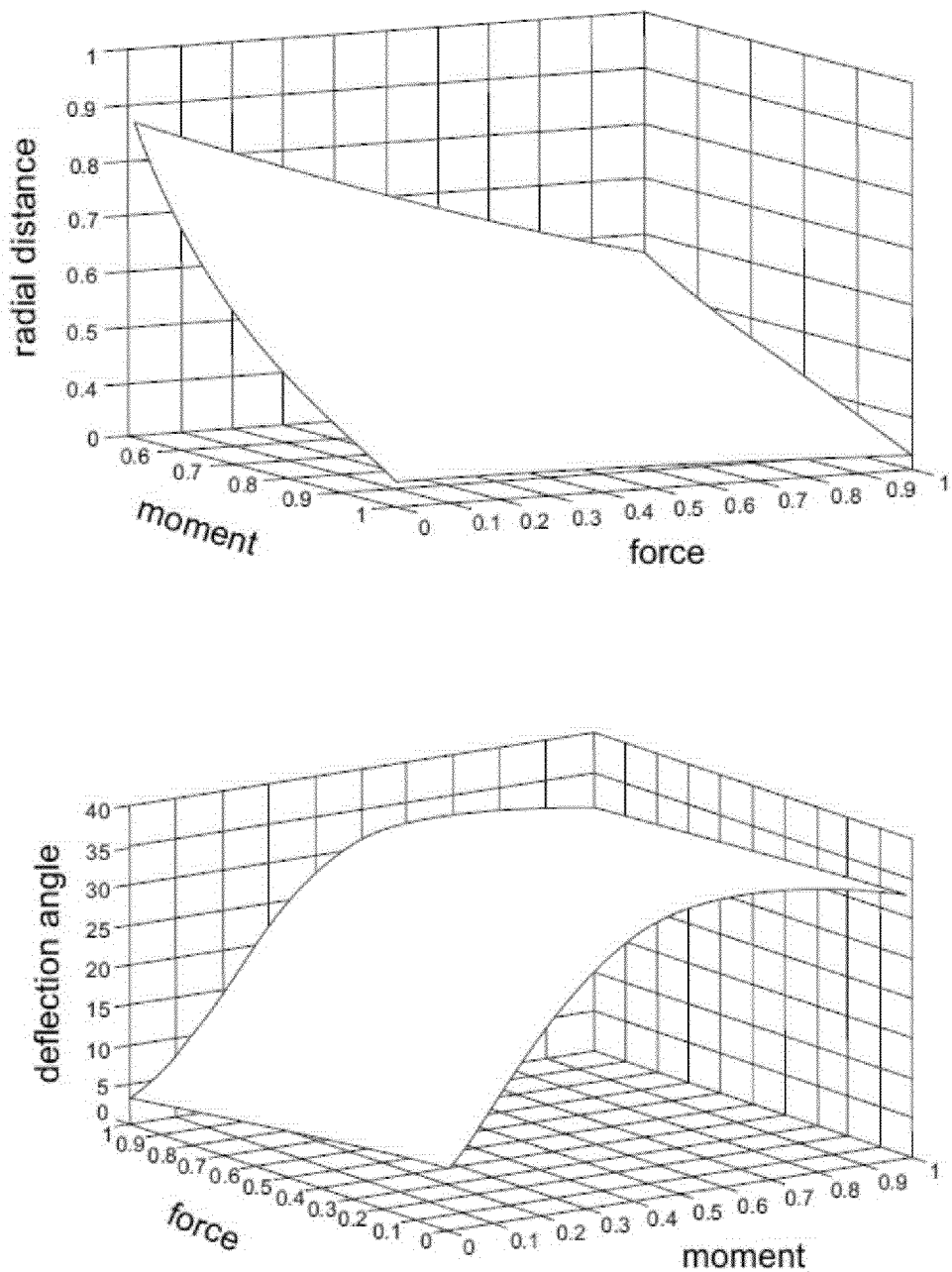

FIG. 16 is a block diagram of an example processor system 1610 that may be used to implement systems, apparatus, and methods described herein. As shown in FIG. 16, the processor system 1610 includes a processor 1612 that is coupled to an interconnection bus 1614.

The processor 1612 may be any suitable processor, processing unit, or microprocessor, for example. Although not shown in FIG. 16, the system 1610 may be a multi-processor system and, thus, may include one or more additional processors that are identical or similar to the processor 1612 and that are communicatively coupled to the interconnection bus 1614.

The processor 1612 of FIG. 16 is coupled to a chipset 1618, which includes a memory controller 1620 and an input/output ("I/O") controller 1622. As is well known, a chipset typically provides I/O and memory management functions as well as a plurality of general purpose and/or special purpose registers, timers, etc. that are accessible or used by one or more processors coupled to the chipset 1618. The memory controller 1620 performs functions that enable the processor 1612 (or processors if there are multiple processors) to access a system memory 1624 and a mass storage memory 1625.

The system memory 1624 may include any desired type of volatile and/or non-volatile memory such as, for example, static random access memory (SRAM), dynamic random access memory (DRAM), flash memory, read-only memory (ROM), etc. The mass storage memory 1625 may include any desired type of mass storage device including hard disk drives, optical drives, tape storage devices, etc.

The I/O controller 1622 performs functions that enable the processor 1612 to communicate with peripheral input/output ("I/O") devices 1626 and 1628 and a network interface 1630 via an I/O bus 1632. The I/O devices 1626 and 1628 may be any desired type of I/O device such as, for example, a keyboard, a video display or monitor, a mouse, etc. The network interface 1630 may be, for example, an Ethernet device, an asynchronous transfer mode ("ATM") device, an 802.11 device, a DSL modem, a cable modem, a cellular modem, etc. that enables the processor system 1610 to communicate with another processor system.

While the memory controller 1620 and the I/O controller 1622 are depicted in FIG. 16 as separate blocks within the chipset 1618, the functions performed by these blocks may be integrated within a single semiconductor circuit or may be implemented using two or more separate integrated circuits.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

Some or all of the system, apparatus, and/or article of manufacture components described above, or parts thereof, can be implemented using instructions, code, and/or other software and/or firmware, etc. stored on a machine accessible or readable medium and executable by, for example, a processor system. When any of the appended claims are read to cover a purely software and/or firmware implementation, at least one of the components is hereby expressly defined to include a tangible medium such as a memory, DVD, Blu-ray, CD, etc. storing the software and/or firmware.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, Blu-ray disc, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments contemplate methods, systems and computer program products on any machine-readable media to implement functionality described above. Certain embodiments may be implemented using an existing computer processor, or by a special purpose computer processor incorporated for this or another purpose or by a hardwired and/or firmware system, for example.

One or more of the components of the systems and/or steps of the methods described above may be implemented alone or in combination in hardware, firmware, and/or as a set of instructions in software, for example. Certain embodiments may be provided as a set of instructions residing on a computer-readable medium, such as a memory, hard disk, DVD, or CD, for execution on a general purpose computer or other processing device. Certain embodiments of the present invention may omit one or more of the method steps and/or perform the steps in a different order than the order listed. For example, some steps may not be performed in certain embodiments of the present invention. As a further example, certain steps may be performed in a different temporal order, including simultaneously, than listed above.

Certain embodiments include computer-readable media for carrying or having computer-executable instructions or data structures stored thereon. Such computer-readable media may be any available media that may be accessed by a general purpose or special purpose computer or other machine with a processor. By way of example, such computer-readable media may comprise RAM, ROM, PROM, EPROM, EEPROM, Flash, CD-ROM or other optical disk storage, magnetic disk storage or other magnetic storage devices, or any other medium which can be used to carry or store desired program code in the form of computer-executable instructions or data structures and which can be accessed by a general purpose or special purpose computer or other machine with a processor. Combinations of the above are also included within the scope of computer-readable media. Computer-executable instructions comprise, for example, instructions and data which cause a general purpose computer, special purpose computer, or special purpose processing machines to perform a certain function or group of functions.

Generally, computer-executable instructions include routines, programs, objects, components, data structures, etc., that perform particular tasks or implement particular abstract data types. Computer-executable instructions, associated data structures, and program modules represent examples of program code for executing steps of certain methods and systems disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of embodiments of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated computer-readable media provide nonvolatile storage of computer-executable instructions, data structures, program modules and other data for the computer.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A method of determining surface topography of an object, the method comprising:
   receiving a first set of moment and force input data from one or more identified topographies;
   using a function approximator to receive a training data set based on the first set of moment and force input data from the one or more identified topographies, wherein parameters to be used by the function approximator are modified via an evolutionary algorithm that tests vectors of candidate parameters; and
   receiving a second set of moment and force input data from an object surface and using the second set of data to provide a surface mapping of the object, wherein the surface mapping comprises a spatial compliance map of the surface, wherein each contact point in the mapping is to be associated with a compliance value represented as a rate of surface compression with respect to a change in contact force.

2. The method of claim 1, wherein the evolutionary algorithm employs a fitness function $$f = \frac{1}{n}\sum_{i=1}^{n}(\delta_{tot} - \delta_i)$$

to modify parameters.

3. The method of claim 1, further comprising spatially registering local topographic mappings to form a combined mapped surface.

4. The method of claim 1, wherein the second set of moment and force input data from an object surface is to be obtained using a sensor array of tactile whisker or hair-like sensors.

5. The method of claim 4, where the sensor array comprises a four by four array.

6. The method of claim 1, wherein the surface mapping comprises a three-dimensional mapping.

7. The method of claim 1, wherein the function approximator comprises at least one of a multilayer perception network and a radial basis function network.

8. The method of claim 1, wherein the moment and force input data comprise two-dimensional moment and one-dimensional force input data.

9. A method of determining material compliance of an object, the method comprising:
   receiving a first set of moment and force input data from identified topographies and compliances;
   training a function approximator using a training data set based on the first set of moment and force input data from the identified topography and compliances, wherein compliance is defined as a change in compression per change in contact force; and
   receiving a second set of moment and force input data from an object surface to form a local topographic and compliance mapping of the object, the forming of the compliance mapping including spatially registering local compliance mappings to form a combined compliance-mapped surface.

10. The method of claim 9, wherein parameters to be used by the function approximator are modified via an evolutionary algorithm that tests vectors of candidate network weights and wherein the evolutionary algorithm employs a fitness function $$f = \frac{1}{n}\sum_{i=1}^{n}(\delta_{tot} - \delta_i)$$

to modify parameters in the function approximator.

11. The method of claim 9, wherein the second set of moment and force input data from the object surface is to be obtained using a sensor array of tactile whisker or hair-like sensors.

12. The method of claim 11, where the sensor array comprises a four by four array.

13. The method of claim 9, wherein the local topographic and compliance mapping comprises a spatial map of the surface.

14. The method of claim 13, wherein the local topographic and compliance mapping comprises a compliance map of the surface, wherein each contact point is to be associated with a compliance value represented as a rate of surface deflection with respect to a change in contact force.

15. The method of claim 9, wherein the mapping of the surface comprises a three-dimensional mapping.

16. The method of claim 9, wherein the function approximator comprises at least one of a multilayer perception network and a radial basis function network.

17. The method of claim 9, wherein the moment and force input data comprise two-dimensional moment and one-dimensional force input data.

18. A tangible computer readable storage medium comprising computer program code which, when executed by a processor, implements a method of determining surface topography of an object, the method comprising:
   receiving a first set of moment and force input data from one or more identified topographies;
   using a function approximator to receive a training data set based on the first set of moment and force input data from the one or more identified topographies, wherein parameters to be used by the functional approximator are modified via an evolutionary algorithm that tests vectors of candidate parameters;
   receiving a second set of moment and force input data from an object surface and using the second set of data to provide a surface mapping of the object, wherein the evolutionary algorithm employs a fitness function $$f = \frac{1}{n}\sum_{i=1}^{n}(\delta_{tot} - \delta_i)$$

to modify parameters.

19. The computer readable storage medium of claim 18, wherein the moment and force input data comprise two-dimensional moment and one-dimensional force input data.

* * * * *

UNITED STATES PATENT AND TRADEMARK OFFICE
CERTIFICATE OF CORRECTION

PATENT NO. : 9,092,737 B2
APPLICATION NO. : 13/663196
DATED : July 28, 2015
INVENTOR(S) : Mitra J. Hartmann et al.

It is certified that error appears in the above-identified patent and that said Letters Patent is hereby corrected as shown below:

In the drawings,

The drawing sheet 12 of 16 consisting of fig. 12 should be deleted and substitute therefore the attached drawing sheet 12 of 16 consisting of replaced fig. 12.

Signed and Sealed this
Twelfth Day of January, 2016

Michelle K. Lee
*Director of the United States Patent and Trademark Office*